US012771871B2

(12) United States Patent
Le Leannec et al.

(10) Patent No.: US 12,771,871 B2
(45) Date of Patent: Oct. 20, 2026

(54) EXTERNALLY ENHANCED PREDICTION FOR VIDEO CODING

(71) Applicant: InterDigital CE Patent Holdings, SAS, Paris (FR)

(72) Inventors: Fabrice Le Leannec, Betton (FR); Philippe Bordes, Laille (FR); Franck Galpin, Thorigne-Fouillard (FR); Antoine Robert, Mezieres sur Couesnon (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 76 days.

(21) Appl. No.: 18/284,769

(22) PCT Filed: Feb. 22, 2022

(86) PCT No.: PCT/EP2022/054314
§ 371 (c)(1),
(2) Date: Sep. 28, 2023

(87) PCT Pub. No.: WO2022/207189
PCT Pub. Date: Oct. 6, 2022

(65) Prior Publication Data
US 2024/0179345 A1 May 30, 2024

(30) Foreign Application Priority Data
Mar. 30, 2021 (EP) .................................... 21305400

(51) Int. Cl.
*H04N 19/597* (2014.01)
*H04N 19/105* (2014.01)
*H04N 19/583* (2014.01)

(52) U.S. Cl.
CPC ......... *H04N 19/597* (2014.11); *H04N 19/105* (2014.11); *H04N 19/583* (2014.11)

(58) Field of Classification Search
CPC .... H04N 19/105; H04N 19/172; H04N 19/58; H04N 19/583; H04N 19/597; H04N 19/70
See application file for complete search history.

(56) References Cited

U.S. PATENT DOCUMENTS 10,743,003 B1 * 8/2020 Waggoner .............. H04N 19/30
2002/0080143 A1 * 6/2002 Morgan .................. G06T 17/00 345/581
(Continued)

FOREIGN PATENT DOCUMENTS

WO WO 2015105868 A1 7/2015
WO WO 2015140391 A1 9/2015
WO WO 2017051077 A1 3/2017

OTHER PUBLICATIONS

"Series H: Audiovisual and Multimedia Systems—Infrastructure of audiovisual services—Coding of moving video—High Efficiency Video Coding (HEVC)", International Telecommunication Union (ITU), Telecommunication Standardization Sector of ITU, Recommendation ITU-T H.265, Oct. 2014, 540 pages.
(Continued)

*Primary Examiner* — Anner Holder
(74) *Attorney, Agent, or Firm* — Condo Roccia Koptiw LLP

(57) ABSTRACT

A video coding system for an image of a video representative of a virtual environment comprises an encoder and a decoder that perform a reconstruction of a differential picture based on a decoded picture buffer, wherein the decoded picture buffer comprises a least a picture based on a reference differential picture and on a second picture generated by a three-dimensional renderer based on the information representative of the virtual environment. An encoding
(Continued)

method and a decoding method are described and comprise adding the reconstructed differential picture is to the second picture.

16 Claims, 16 Drawing Sheets

(56) References Cited

U.S. PATENT DOCUMENTS

| | | | | |
|---|---|---|---|---|
| 2004/0223003 | A1* | 11/2004 | Heirich | G06T 15/005 345/629 |
| 2005/0062994 | A1* | 3/2005 | Shiraishi | G06F 3/12 358/1.9 |
| 2007/0230573 | A1* | 10/2007 | Iguchi | H04N 19/51 375/E7.113 |
| 2010/0008422 | A1* | 1/2010 | Shimizu | H04N 19/577 375/E7.123 |
| 2011/0222602 | A1* | 9/2011 | Sung | H04N 19/597 375/E7.243 |
| 2012/0075436 | A1* | 3/2012 | Chen | H04N 13/161 348/51 |
| 2013/0342644 | A1* | 12/2013 | Rusanovskyy | H04N 19/597 348/43 |
| 2014/0105299 | A1* | 4/2014 | Chen | H04N 19/30 375/240.15 |
| 2015/0010083 | A1* | 1/2015 | Lee | H04N 19/105 375/240.12 |
| 2015/0195528 | A1* | 7/2015 | Wang | H04N 19/30 375/240.02 |
| 2016/0165262 | A1* | 6/2016 | Rusanovskyy | H04N 19/44 375/240.25 |
| 2016/0330493 | A1* | 11/2016 | Chuah | H04N 21/637 |
| 2017/0302918 | A1* | 10/2017 | Mammou | H04N 19/103 |
| 2019/0208200 | A1* | 7/2019 | Galpin | H04N 19/593 |
| 2019/0371060 | A1* | 12/2019 | Energin | G06T 17/05 |
| 2020/0322656 | A1* | 10/2020 | Reitmeier | H04N 21/4384 |

OTHER PUBLICATIONS

Bross et al., "Versatile Video Coding (Draft 10)", Joint Video Experts Team (JVET) of ITU-T SG 16 WP 3 and ISO/IEC JTC 1/SC 29/WG 11, Document JVET-S2001_vG, 19th meeting, by teleconference, Jun. 22, 2020, 544 pages.

Liu et al., "Enhancing Video Encoding for Cloud Gaming Using Rendering Information", Institute of Electronics and Electrical Engineers (IEEE), IEEE Transactions on Circuits and Systems for Video Technology, vol. 25, Issue No. 12, Dec. 2015, 15 pages.

"Infrastructure of audiovisual services—Coding of moving video—Versatile Video Coding", International Telecommunication Union (ITU), ITU-T Telecommunication Standardization Sector of ITU, Series H: Audiovisual and Multimedia Systems, Recommendation ITU-T H.266, Aug. 2020, 516 pages.

Nan et al., "Delay-Rate-Distortion Optimization for Cloud Gaming With Hybrid Streaming", Institute of Electronics and Electrical Engineers (IEEE), IEEE Transactions on Circuits and Systems for Video Technology, vol. 27, Issue No. 12, Dec. 2017, 15 pages.

Lasserre et al., "Description of the scalable video coding technology proposal by Canon Research Centre France", Joint Collaborative Team on Video Coding (JCT-VC) of ITU-T SG16 WP3 and ISO/IEC JTC1/SC29/WG11, Document: JCTVC-K0041, 11th Meeting, Shanghai, China, Oct. 10, 2012, 78 pages.

Levoy et al., "Polygon-Assisted JPEG and MPEG Compression of Synthetic Images", Association for Computing Machinery (ACM), SIGGRAPH '95: Proceedings of the 22nd annual conference on Computer graphics and interactive techniques, Sep. 1995, 8 pages.

Bordes et al., "AHG17: External references picture", Joint Video Experts Team (JVET) of ITU-T SG 16 WP 3 and ISO/IEC JTC 1/SC 29/WG 11, Document: JVET P0326_v2, 16th Meeting, Geneva, Switzerland, Oct. 1, 2019, 6 pages.

"Infrastructure of audiovisual services—Coding of moving video—High Efficiency Video Coding", International Telecommunication Union (ITU), ITU-T Telecommunication Standardization Sector of ITU, Series H: Audiovisual and Multimedia Systems, Recommendation ITU-T H.265, Apr. 2015, 634 pages.

"Advanced Video Coding for Generic Audiovisual Services—Infrastructure of Audiovisual Services—Coding of moving video", International Telecommunication Union (ITU), Series H: Audiovisual and Multimedia Systems, ITU-T Telecommunication Standardization Sector of ITU, Recommendation ITU-T H.264, Apr. 2017, 812 pages.

Chuah et al., "Cloud Gaming: A Green Solution to Massive Multiplayer Online Games", Institute of Electrical and Electronics Engineers (IEEE), IEEE Wireless Communications, vol. 21, Issue No. 4, Aug. 2014, 10 pages.

Chuah et al., "Layered Coding for Mobile Cloud Gaming", Association for Computing Machinery (ACM), MMVE '14: Proceedings of International Workshop on Massively Multiuser Virtual Environments, Singapore, Mar. 2014, 6 pages.

* cited by examiner

| slice_header( ) { | Descriptor |
|---|---|
| … | |
| sh_external_coding_parameter_flag | u(1) |
| if( sh_external_coding_parameter_flag ) { | |
| sh_ecp_motion_info_flag | u(1) |
| sh_ecp_gpm_partition_flag | u(1) |
| … | |
| } | |
| … | |
| } | |

| merge_data(x0, y0, cbWidth, cbHeight, chType ) { | Descriptor |
|---|---|
| … | |
| if( sps_ciip_enabled_flag && sps_gpm_enabled_flag<br>&& sh_slice_type = = B && cu_skip_flag[ x0 ][ y0 ] = = 0<br>&& cbWidth >= 8 && cbHeight >= 8<br>&& cbWidth < ( 8 * cbHeight ) && cbHeight < ( 8 * cbWidth )<br>&& cbWidth < 128 && cbHeight < 128 ) | |
| ciip_flag[ x0 ][ y0 ] | ae(v) |
| if( ciip_flag[ x0 ][ y0 ] && MaxNumMergeCand > 1 ) | |
| merge_idx[ x0 ][ y0 ] | ae(v) |
| if( !ciip_flag[x0 ][ y0 ] ) { | |
| if ( ! sh_ecp_gpm_partition_flag ) | |
| merge_gpm_partition_idx[ x0 ][ y0 ] | ae(v) |
| merge_gpm_idx0[ x0 ][ y0 ] | ae(v) |
| if( MaxNumGpmMergeCand > 2 ) | |
| merge_gpm_idx1[ x0 ][ y0 ] | ae(v) |
| } | |
| … | |

Figure 18

| slice_header( ) { | Descriptor |
|---|---|
| … | |
| sh_external_coding_parameter_flag | u(1) |
| if( sh_external_coding_parameter_flag ) { | |
| sh_ecp_additional_motion_candidate_flag | u(1) |
| … | |
| } | |
| … | |
| } | |

Figure 19

EXTERNALLY ENHANCED PREDICTION FOR VIDEO CODING

CROSS REFERENCE TO RELATED APPLICATIONS

This application is a U.S. National Stage Application under 35 U.S.C. § 371 of International Patent Application No. PCT/EP2022/054314, filed 22 Feb. 2022, which is incorporated herein by reference in its entirety.

This application claims priority to European Application No. 21305400.0 filed 30 Mar. 2021, which is incorporated herein by reference in its entirety.

TECHNICAL FIELD

At least one of the present embodiments generally relates to temporal prediction for video compression for example applied in the context of cloud gaming.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

Cloud gaming uses video coding to convey the game action to the user. Indeed, in such context, the 3D environment of the game is rendered on a server, video encoded and provided to the decoder as a video stream. The decoder displays the video and, in response, transmits user inputs back to the server, thus allowing the interaction with the game elements and/or other users.

SUMMARY

At least one of the present embodiments relates to video coding system for an image of a video representative of a virtual environment, that provides temporal prediction for a current image using a reference picture buffer storing at least an image based on a second image obtained from graphics renderer, the quality of the second image being lower than the quality of the current image.

According to a first aspect of at least one embodiment, a method for decoding a block of pixels of a current image (curr) of a video comprises obtaining information representative of an encoded video using differential coding comprising at least the difference ($curr-g_{curr}$) between the current image and a second image ($g_{curr}$), the second image corresponding to a representation of the current image, the second image being obtained from an external process and being different from the current picture (curr) being decoded; performing temporal prediction based on inter layer prediction wherein a decoded picture buffer comprises differential pictures storing at least a differential image based on the second image and: decoding and reconstructing the temporally predicted image.

According to a second aspect of at least one embodiment, a method for encoding a block of pixels of a current image (curr) of a video comprises performing temporal prediction using differential coding wherein a decoded picture buffer comprises differential pictures storing at least a differential image based on a second image ($g_{curr}$) corresponding to a representation of the current image, the second image being obtained from an external process and being different from the current picture (curr) being encoded and: encoding the temporally predicted image comprising at least coding ($curr-g_{curr}$) the difference between the current image and the second image.

According to a third aspect of at least one embodiment, a method for decoding a block of pixels of a current image (curr) of a video comprises obtaining information representative of an encoded video: performing temporal prediction based on external reference picture wherein a decoded picture buffer comprises at least a picture based on a second image ($g_{curr}$) corresponding to a representation of the current image, the second image being obtained from an external process and being different from the current picture (curr) being encoded and; decoding and reconstructing the temporally predicted image.

According to a fourth aspect of at least one embodiment, a method for encoding a block of pixels of a current image (curr) of a video comprises performing temporal prediction based on external reference picture wherein a decoded picture buffer comprises at least a picture based on a second image ($g_{curr}$) corresponding to a representation of the current image, the second image being obtained from an external process and being different from the current picture (curr) being encoded and: encoding the temporally predicted image comprising at least coding the current image.

According to a fifth aspect of at least one embodiment, an apparatus for decoding a block of pixels of a current image of a video representative of a virtual environment, comprising: a graphics renderer configured to generate a second image based on the virtual environment, a decoder being configured to: obtain information representative of an encoded video using differential coding comprising at least the difference ($curr-g_{curr}$) between the current image and a second image ($g_{curr}$), the second image corresponding to a representation of the current image, the second image being obtained from an external process and being different from the current picture (curr) being decoded: perform temporal prediction based on inter layer prediction wherein a decoded picture buffer comprises differential pictures storing (1240) at least a differential image based on the second image and: decode and reconstruct the temporally predicted image.

According to a sixth aspect of at least one embodiment, an apparatus for encoding a block of pixels of a current image of a video representative of a virtual environment, comprises a graphics renderer configured to generate a second image based on the virtual environment, an encoder being configured to perform temporal prediction using differential coding wherein a decoded picture buffer comprises differential pictures storing at least a differential image based on a second image ($g_{curr}$) corresponding to a representation of the current image, the second image being obtained from an external process and being different from the current picture (curr) being encoded and: encode the temporally predicted image comprising at least coding ($curr-g_{curr}$) the difference between the current image and the second image.

According to a seventh aspect of at least one embodiment, an apparatus for decoding a block of pixels of a current image of a video representative of a virtual environment, comprises a graphics renderer configured to generate a second image based on the virtual environment, a decoder being configured to: obtain information representative of an encoded video: perform temporal prediction based on external reference picture wherein a decoded picture buffer comprises at least a picture based on a second image ($g_{curr}$) corresponding to a representation of the current image, the second image being obtained from an external process and being different from the current picture (curr) being encoded and: decode and reconstruct the temporally predicted image.

According to an eighth aspect of at least one embodiment, an apparatus for encoding a block of pixels of a current image of a video representative of a virtual environment, comprises a graphics renderer configured to generate a second image based on the virtual environment, an encoder being configured to: perform temporal prediction based on external reference picture wherein a decoded picture buffer comprises at least a picture based on a second image ($g_{curr}$) corresponding to a representation of the current image, the second image being obtained from an external process and being different from the current picture (curr) being encoded and: encode the temporally predicted image comprising at least coding the current image.

According to variant embodiments of former aspects, the quality of the second image is lower than the quality of the current image.

According to a ninth aspect of at least one embodiment, a computer program comprising program code instructions executable by a processor is presented, the computer program implementing the steps of a method according to at least the first, second, third or fourth aspect.

According to a tenth aspect of at least one embodiment, a computer program product which is stored on a non-transitory computer readable medium and comprises program code instructions executable by a processor is presented, the computer program product implementing the steps of a method according to at least the first, second, third or fourth aspect when executed on a processor.

According to an eleventh aspect of at least one embodiment, a video coding system comprises the server apparatus according to the sixth aspect and the client apparatus according to the fifth aspect.

According to a twelfth aspect of at least one embodiment, a video coding system comprises the server apparatus according to the eighth aspect and the client apparatus according to the seventh aspect.

Although the embodiments are described herein in a gaming context, the principles described may apply to other contexts requiring the transmission of high quality graphics from a first device to a second device.

BRIEF DESCRIPTION OF THE DRAWINGS

FIG. 18 illustrates an example of syntax according to an embodiment where the external coding parameter is Gpm_partition.

FIG. 19 illustrates an example of syntax according to an embodiment where the external coding parameter is an additional motion vector candidate.

DETAILED DESCRIPTION

Figure 1:
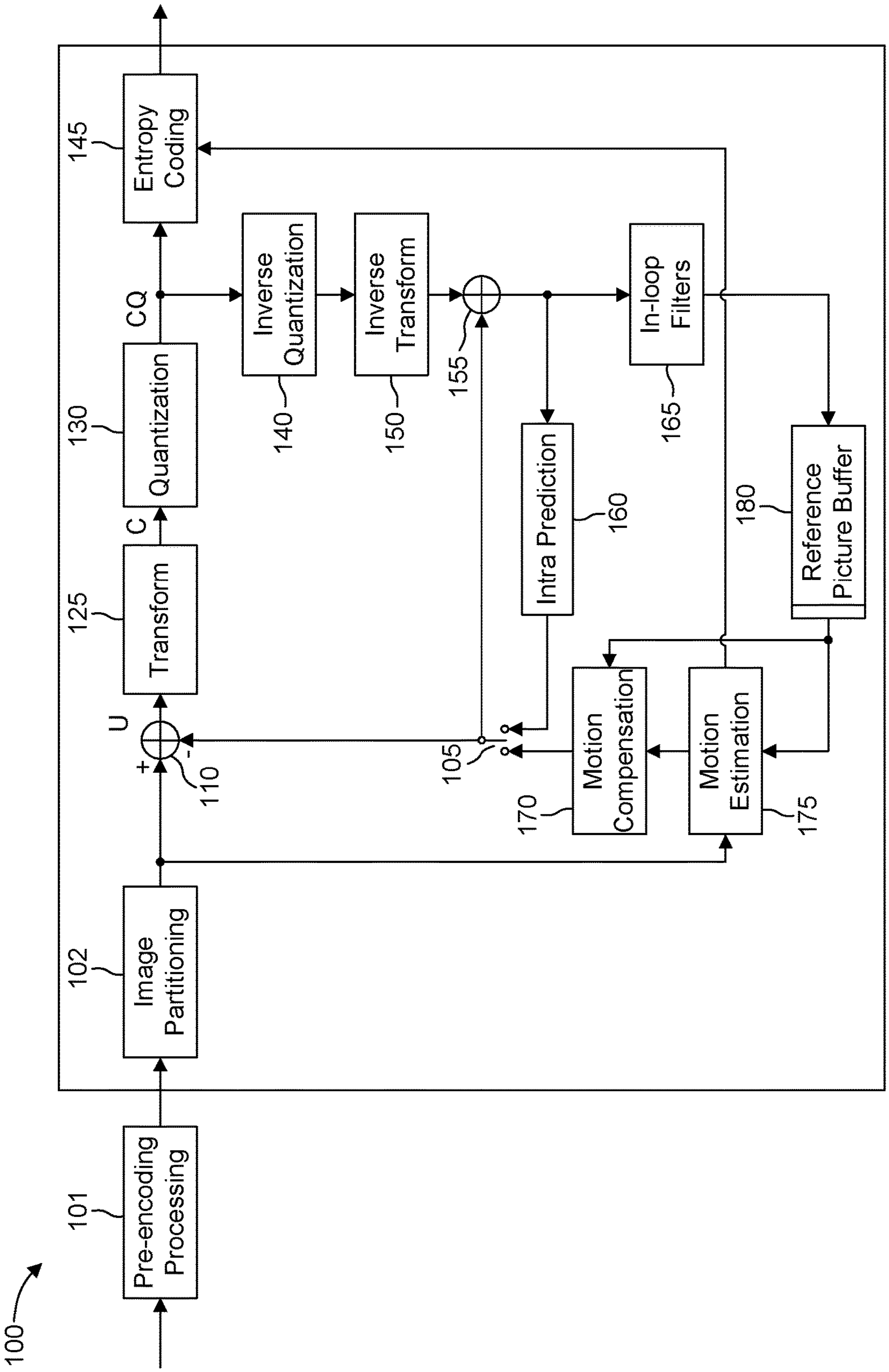
FIG. 1 illustrates a block diagram of an example of video encoder 100.

FIG. 1 illustrates block diagram of an example of video encoder 100. Examples of video encoders comprise a High Efficiency Video Coding (HEVC) encoder compliant with the HEVC standard, or a HEVC encoder in which improvements are made to the HEVC standard or an encoder employing technologies similar to HEVC, such as a JEM (Joint Exploration Model) encoder under development by JVET (Joint Video Exploration Team) for Versatile Video Coding (VVC) standardization, or other encoders.

Before being encoded, the video sequence can go through pre-encoding processing (101). This is for example performed by applying a color transform to the input color picture (for example, conversion from RGB 4:4:4 to YCbCr 4:2:0) or performing a remapping of the input picture components in order to get a signal distribution more resilient to compression (for instance using a histogram equalization of one of the color components). Metadata can be associated with the pre-processing and attached to the bitstream.

In HEVC, to encode a video sequence with one or more pictures, a picture is partitioned (102) into one or more slices where each slice can include one or more slice segments. A slice segment is organized into coding units, prediction units, and transform units. The HEVC specification distinguishes between “blocks” and “units,” where a “block” addresses a specific area in a sample array (for example, luma, Y), and the “unit” includes the collocated blocks of all encoded color components (Y, Cb, Cr, or monochrome), syntax elements, and prediction data that are associated with the blocks (for example, motion vectors).

For coding in HEVC, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU.

In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes. Indeed, in other coding standards, such as the one under development by JVET, the block shapes can be different from square blocks (for example rectangular blocks), the maximal block size can be bigger and the arrangement of blocks can be different.

In the example of encoder 100, a picture is encoded by the encoder elements as described below: The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar, and 33 angular prediction modes. The intra prediction reference is reconstructed from the row and column adjacent to the current block. The reference extends over two times the block size in the horizontal and vertical directions using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed. The motion information (for example, motion vector and reference picture index) can be signaled with two methods, namely, "merge mode" and "advanced motion vector prediction (AMVP)".

In the merge mode, a video encoder or decoder builds a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder builds candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

The prediction residuals are then transformed (125) and quantized (130), including at least one embodiment for adapting the chroma quantization parameter described below. The transforms are generally based on separable transforms. For instance, a DCT transform is first applied in the horizontal direction, then in the vertical direction. In recent codecs such as the JEM, the transforms used in both directions may differ (for example, DCT in one direction, DST in the other one), which leads to a wide variety of 2D transforms, while in previous codecs, the variety of 2D transforms for a given block size is usually limited.

The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, that is, the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
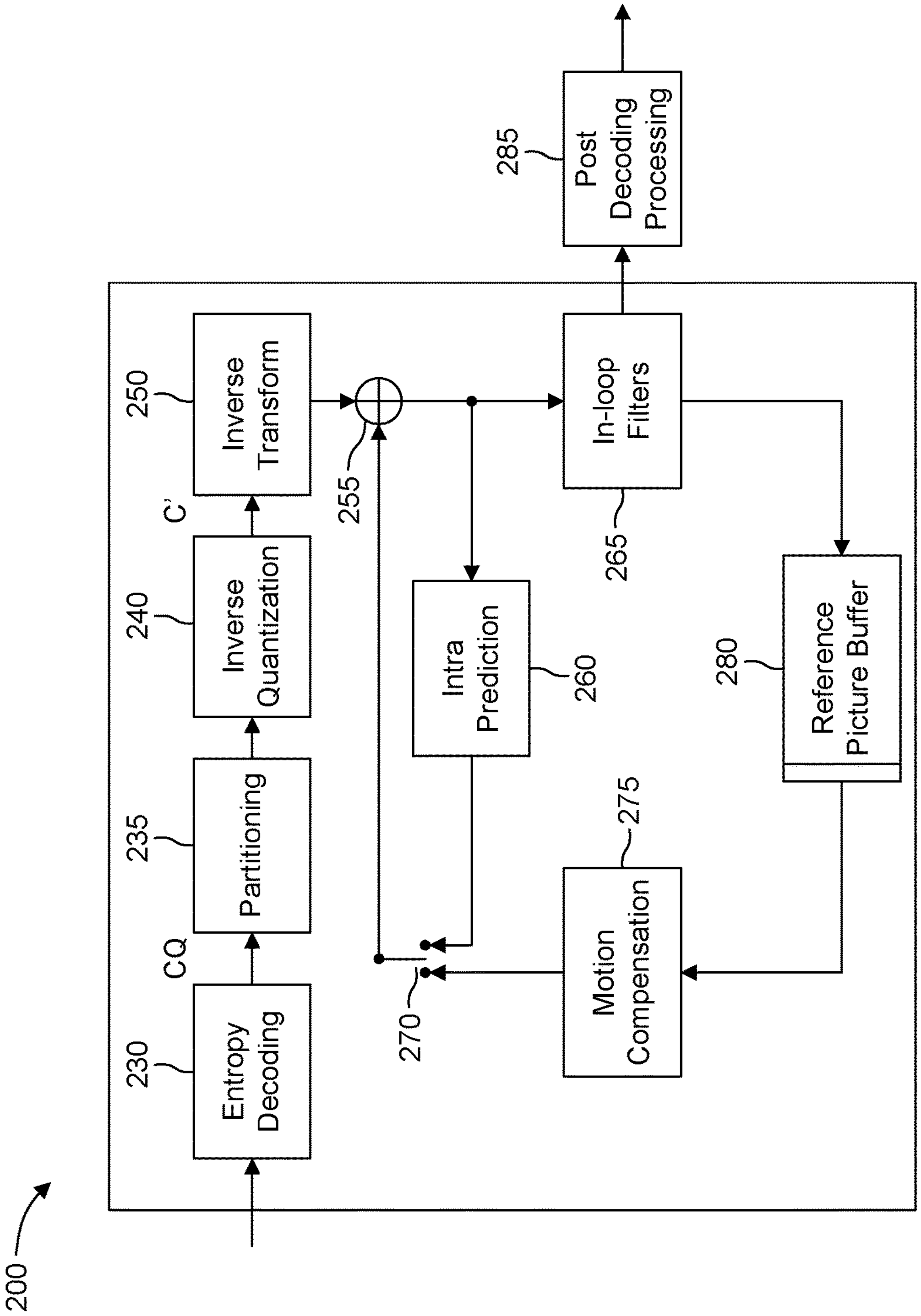
FIG. 2 illustrates a block diagram of an example of video decoder 200.

FIG. 2 illustrates a block diagram of an example of video decoder 200. Examples of video decoders comprise a High Efficiency Video Coding (HEVC) decoder compliant with the HEVC standard, or a HEVC decoder in which improvements are made to the HEVC standard or a decoder employing technologies similar to HEVC, such as a JEM (Joint Exploration Model) decoder under development by JVET (Joint Video Exploration Team) for Versatile Video Coding (VVC) standardization, or other decoders.

In the example of decoder 200, a bitstream is decoded by the decoder elements as described below. Video decoder 200 generally performs a decoding pass reciprocal to the encoding pass as described in FIG. 1, which performs video decoding as part of encoding video data.

In particular, the input of the decoder includes a video bitstream, which may be generated by video encoder 100. The bitstream is first entropy decoded (230) to obtain transform coefficients, motion vectors, picture partitioning information, and other coded information. The picture partitioning information indicates the size of the CTUs, and a manner a CTU is split into CUs, and possibly into PUs when applicable. The decoder may therefore divide (235) the picture into CTUs, and each CTU into CUs, according to the decoded picture partitioning information. The transform coefficients are de-quantized (240) including at least one embodiment for adapting the chroma quantization parameter described below and inverse transformed (250) to decode the prediction residuals.

Combining (255) the decoded prediction residuals and the predicted block, an image block is reconstructed. The predicted block may be obtained (270) from intra prediction (260) or motion-compensated prediction (that is, inter prediction) (275). As described above, AMVP and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

The decoded picture can further go through post-decoding processing (285), for example, an inverse color transform (for example conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

Figure 3:
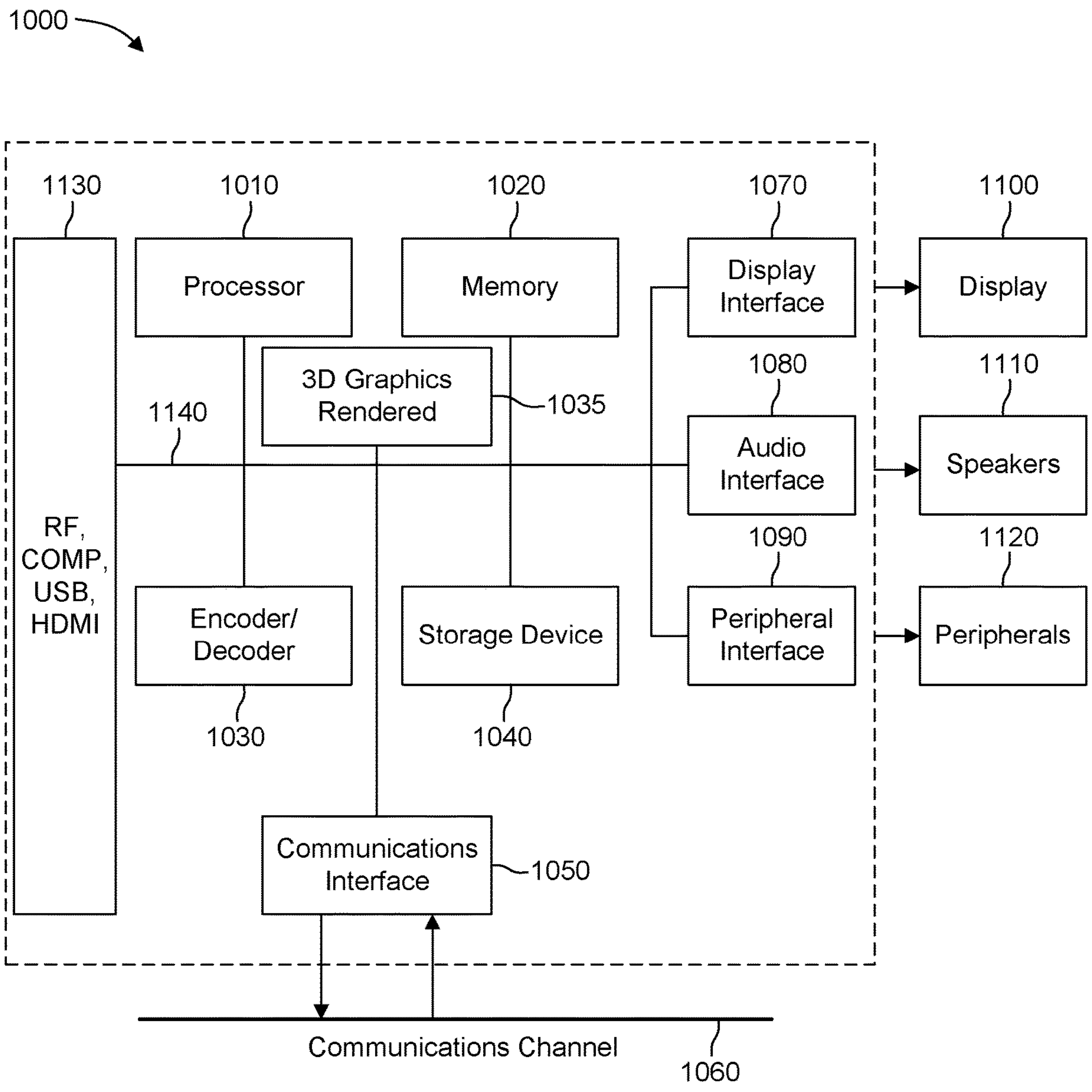
FIG. 3 illustrates a block diagram of an example of a system in which various aspects and embodiments are implemented.

FIG. 3 illustrates a block diagram of an example of a system in which various aspects and embodiments are implemented. System 1000 can be embodied as a device including the various components described below and is configured to perform one or more of the aspects described in this application. Examples of such devices include, but are not limited to, various electronic devices such as personal computers, laptop computers, smartphones, tablet computers, digital multimedia set top boxes, digital television receivers, personal video recording systems, connected home appliances, encoders, transcoders, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

System 1000 comprises also a graphics rendered module 1035 configured, for example, to render 3D graphics, in other words, to generate an image that corresponds to a specific view in a 3D environment as will be explained further below.

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal. In various embodiments, the input devices of block 1130 have associated respective input processing elements as known in the art. For example, the RF portion can be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the data stream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs. The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Figure 4A:
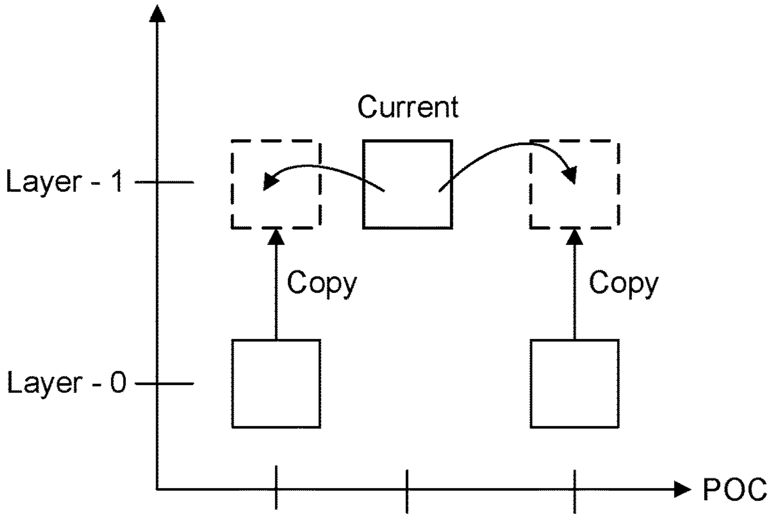
FIGS. 4A and 4B illustrate the principles of scalability in a block-based video coding standard.
Figure 4B:
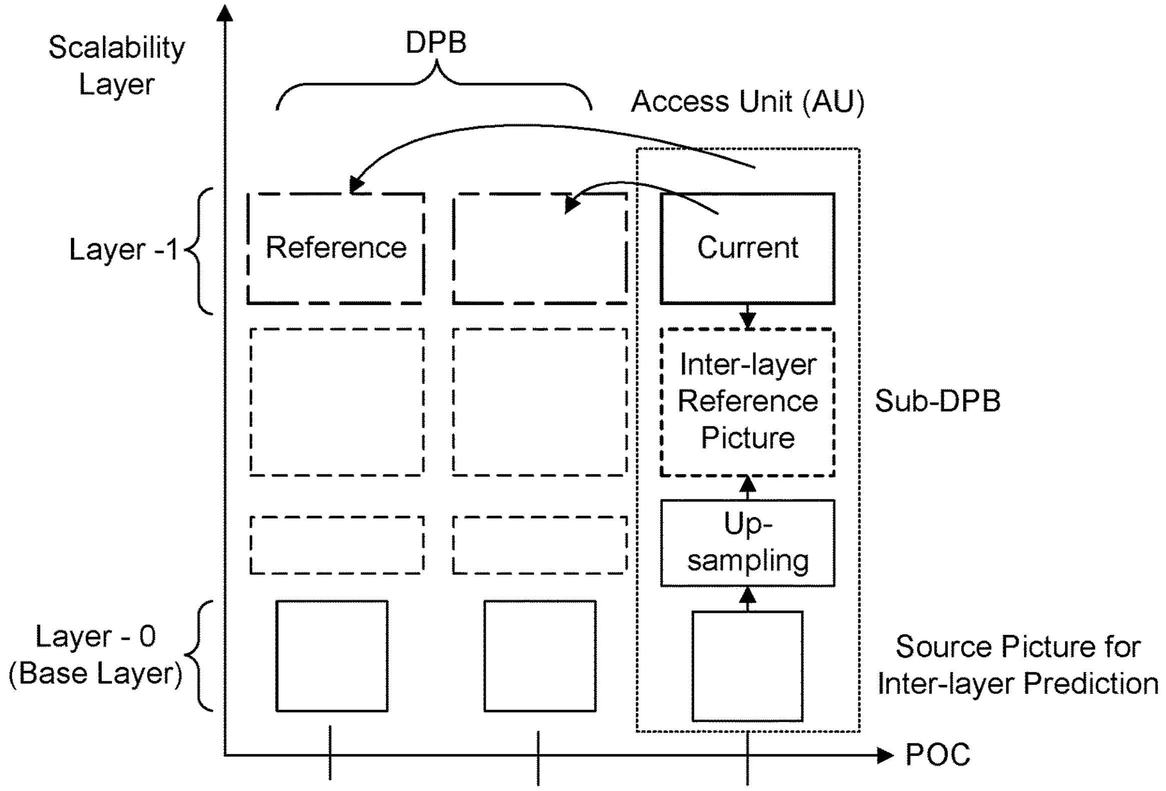

FIGS. 4A and 4B illustrate the principles of scalability in a block-based video coding standard. When a video codec uses scalability, the coded video bit-stream generated by the encoder may comprise several layers which allow encoding video sequences with a base representation and an enhanced representation. The base representation is typically obtained and reconstructed through the decoding of the base layer. The enhanced representation is obtained through the decoding of the base layer and also the enhancement layer, which typically contains refinement information over the base layer. An enhancement layer provides enhanced quality or additional feature compared to underlying layers in the scalable bit-stream, i.e. the a base layer stream or another enhancement layer. A scalable video bit-stream typically comprises a base layer and one or several enhancement layers. For example, the reconstructed images issued from a an enhancement layer may enhance resolution (spatial scalability), quality (SNR scalability), frame rate (temporal scalability), color gamut (color gamut scalability, high dynamic range scalability), bit-depth (bit-depth scalability), additional point-of-view (multi-view scalability), etc. over the underlying layer. The scalable video codecs leverage the capability to encoder/decode blocks conditionally to images and/or coded information from other bitstreams/layers it depends on.

FIG. 4A depicts temporal scalability where a temporal enhancement layer contains coded pictures, which increase the frame rate of the underlying scalability layer. Typically, a temporal enhancement layer doubles the frame rate over the underlying layer. A picture contained an enhancement layer (say layer 1) can be predicted from pictures in the same layer and from picture in lower layer in the scalable hierarchy. On the contrary, coded pictures from a lower layer (say lower 0) than a current temporal layer cannot be predicted from pictures contained in the current temporal layer. The dependencies between coded picture in a temporal layer 0 and a temporal layer 1 are illustrated on the exemplary FIG. 4A.

FIG. 4B illustrates an example of spatial scalability of a conventional block-based video coding standard. In this example, the reconstructed pictures from the base layer (layer-0) may be re-scaled (e.g. up-sampled) and used as additional reference frame for building inter-prediction for the current layer (layer-1). Such additional reference frame is called inter-layer reference picture (ILRP) and is stored in a sub section of the decoded picture buffer (Sub-DPB). The inter-layer reference picture (ILRP) is temporally co-located with the current picture of the current layer, in other words they have same POC.

Figure 5A:
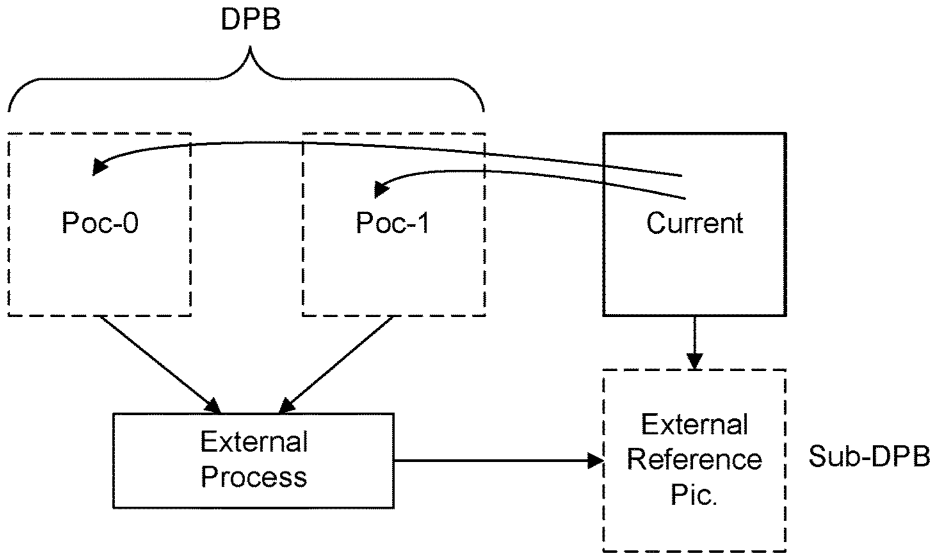
FIGS. 5A and 5B illustrate the principles of using external reference picture in a block-based video coding standard.
Figure 5B:
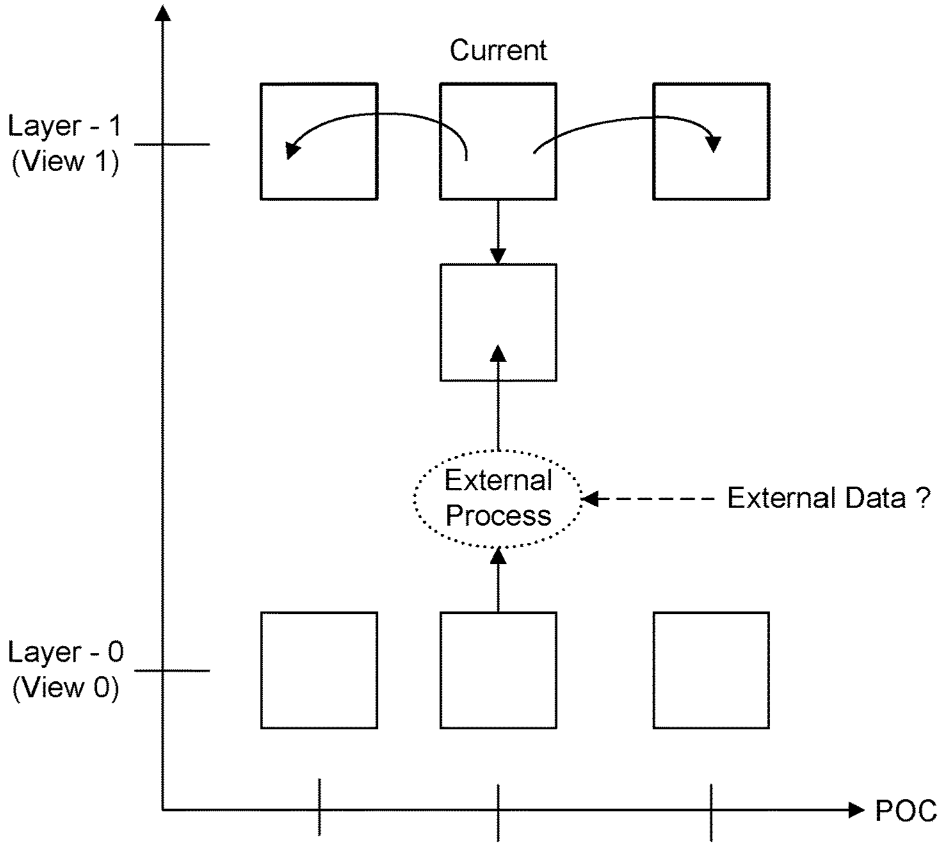

FIGS. 5A and 5B illustrate the principles of using external reference picture in a block-based video coding standard. Two cases may be considered: using external reference picture (ERP) in single layer streams (FIG. 5A) or using ERP as base layer (inter-layer reference picture, FIG. 5B). The ERP is signaled in the reference picture list structure, in the VPS (Video Parameter Set) or the SPS (Sequence Parameter Set). The ERP is not displayed but may be used to build prediction for the CUS (Coding Units) coded in inter mode.

Figure 6:
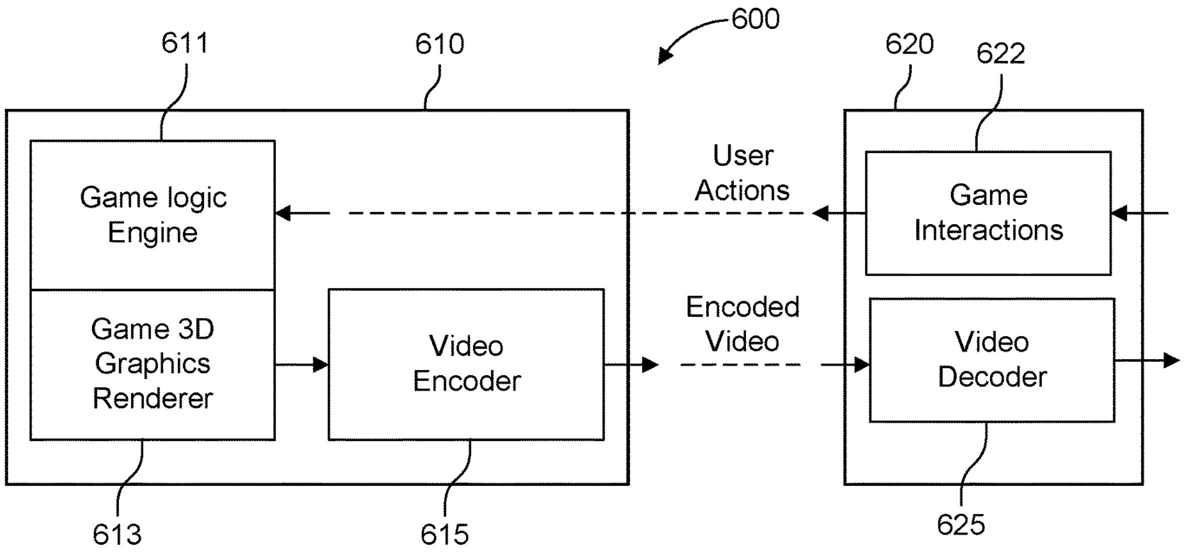
FIG. 6 illustrates an example of a cloud gaming system.

FIG. 6 illustrates an example of a cloud gaming system. In a conventional gaming system, i.e. a fully locally rendered game, the user handles a device with sufficient computation capabilities to render 3D virtual environments such as game consoles or computers with high end graphics cards hardware specialized in rendering images from a 3D virtual environment. Interactions and updates of the environment, thus rendering, are performed locally. Some interaction data may be sent to the server to synchronize the virtual environment within multiple players. A cloud gaming ecosystem is different in the sense that the rendering hardware is transferred into the cloud so that the user may use devices with limited computation capabilities. Thus, the client device may be cheaper or even may be a device already present in the home such as low-end computers, tablets, low-end smartphones, set top boxes, televisions, etc.

In such system, the game engine (611) and the 3D graphics rendering (613), which require costly and power consuming devices, is performed by a game server (610) located remotely from the user, for example in the cloud. Next, the rendered frames are encoded with a video encoder (615) and the resulting encoded video stream is transmitted through a conventional communication network to the client device (620) where it may be decoded with a video decoder (625). An additional module is in charge on managing the user's interactions and frame synchronization (622) and transmit commands back to the server. Updates of the 3D virtual environment are done by the game engine. The outgoing video stream may be generated continuously, reflecting the current state of the 3D virtual environment according to the user's point of view.

Figure 7:
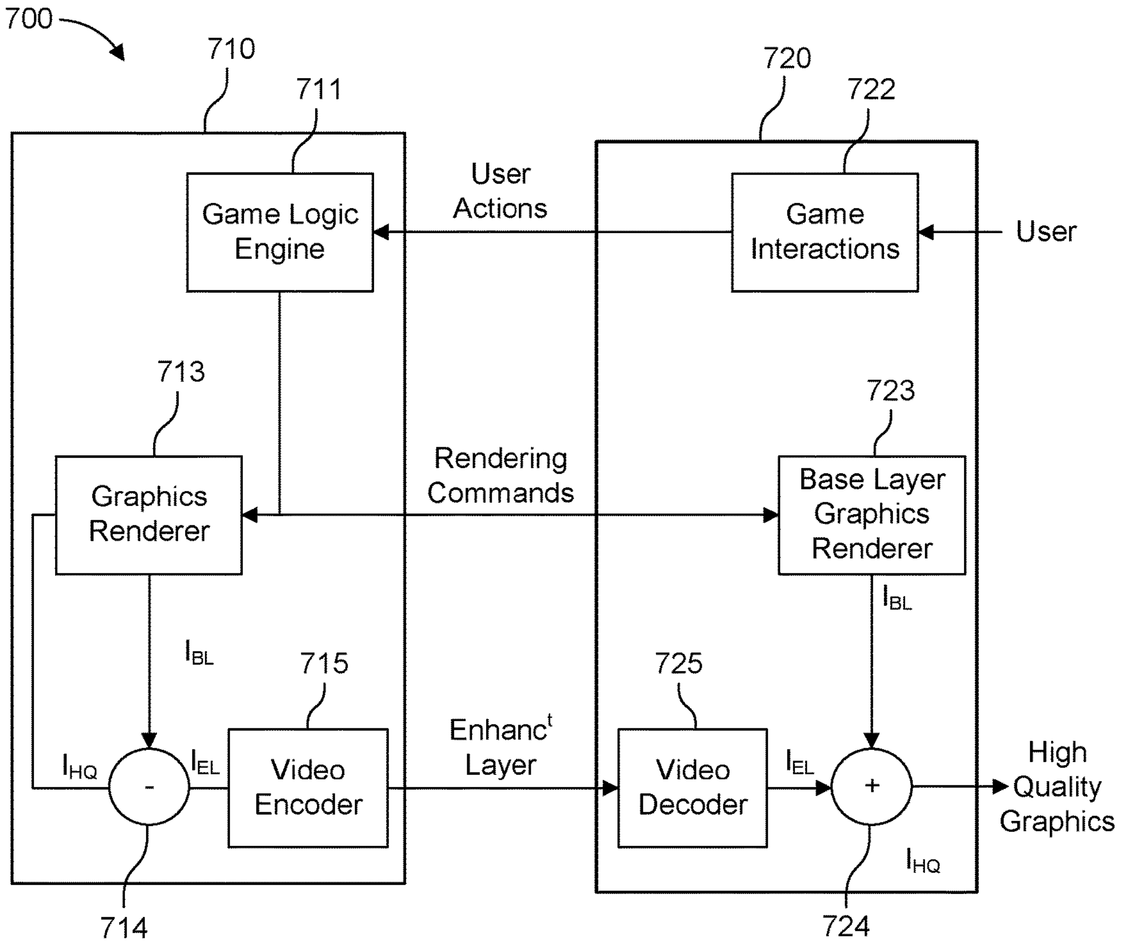
FIG. 7 illustrates a second example of a cloud gaming system.

FIG. 7 illustrates a second example of a cloud gaming system. This example implementation of a cloud gaming system 700 makes use of increasing computation capabilities in devices such as laptops, smartphones, tablets and set top boxes that, in some cases, comprise some 3D graphics rendering hardware capabilities. However, these capabilities may not be sufficient to offer high quality rendering since this may require the integration of complex and costly hardware, significant data memory and in addition may consume much energy. However, these devices are particularly adapted to provide a basic level of rendering. In this case, a hybrid approach can be used to supplement the client graphics basic level rendering by coding an enhanced layer computed as the difference between full capability game rendered images as rendered by a high-quality graphics rendering at the server side and the client graphics basic level rendering. This difference is encoded by a video encoder module on the server, transmitted through a communication network to the client device, decoded by a video decoder and added to the client graphics basic level rendered image.

In the FIG. 7, the cloud gaming system 700 comprises a game server 710 and a game client device 720. On the game server side, based on the virtual environment, the game logic engine 711 instructs a high quality graphics renderer 713 to generate a base layer image $I_{BL}$ and a high quality image $I_{HQ}$. The difference between those two images is determined 714 and represents an enhancement layer image $I_{EL}$ that is encoded by the video encoder 715.

On the game client side, a base layer graphics renderer 723 obtains the rendering commands from the game logic engine and generates a base layer image $I_{BL}$ which should be identical to the base layer image generated on the server side. A video decoder 725 receives the enhancement layer and generates a corresponding enhancement image $I_{EL}$ that is added 724 to the base layer image $I_{BL}$ to reconstruct a high quality image $I_{HQ}$. The user provides some interactions through appropriate input interfaces, conveyed tough the game interactions module 722 back to the game server 710. The game logic can then update the parameters of the 3D virtual environment (e.g. position of the user) and request the graphics renderers to generate update images.

The basic principle of such architecture approach is to benefit from graphics/game rendering steps on the client side and make them synergize with the video decoder. For instance, light and partial game rendering on the client side may allow discarding a part of the information to code in the video bit-stream. For that purpose, the implementation of FIG. 7 uses a differential video coding approach where a differential video is coded as the difference between a fully (high quality) rendered video game picture and a corresponding picture partially rendered by the client hardware. Such implementation already leads to a significant amount of bitrate reduction.

In the following, the general concept of inter-layer prediction is noted ILP. As previously explained ILP is involved in scalable video coding to exploit the redundancy that may exist between a base and an enhancement layer. The limitations of existing layered coding framework is explained hereafter.

Two kinds of existing architectural frameworks for layered video coding in cloud gaming are considered here. For the typical layered coding approach shown by FIG. 7, the difference signal between a current frame is systematically coded.

Figure 8A:
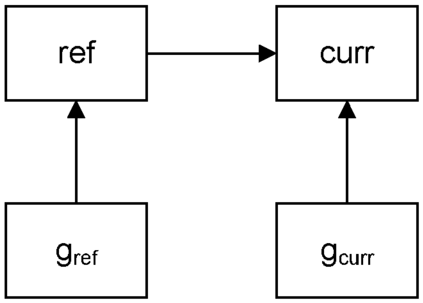
FIGS. 8A, 8B, 8C illustrate the dependencies that exist between coded pictures in different coding approaches.

FIG. 8A illustrates the dependencies that exist between coded pictures in a general layered coding approach. The following variables are shown:

curr is the current picture to code or decode.

g_curr is the version of the current picture provided by the local decoder side partial graphic rendering stage. It is used as the inter-layer reference picture used to code the current picture curr.

ref is a temporal reference picture used for the prediction of current picture curr during its encoding/decoding.

g_ref is the base picture of the picture ref, i.e. the base layer picture that temporally coincides with the reference picture ref. More precisely, the picture g_ref corresponds to the picture generated by the base layer graphics renderer present on the client side in the considered cloud gaming system.

In conventional scalable video coding, when encoding the current enhancement picture curr, for each block to code, the encoder tries to use the best prediction mode for that block. The prediction mode is chosen between temporal prediction (for instance with reference to a temporal reference picture ref), intra prediction and inter-layer prediction (for instance with reference to the base picture g_curr). The selected prediction mode is signaled in the coded bit-stream. On the decoder side, the prediction mode is parsed, and the same prediction as on the encoder side applies. In modern scalable video coders (such as SHVC or VVC for example), the signaling of inter-layer prediction is achieved by means of the reference picture index signaling (for example the syntax elements ref_idx_10 and ref_idx_11 of VVC specification "Versatile video coding, ITU-T H.266, SERIES H: AUDIOVISUAL AND MULTIMEDIA SYSTEMS Infrastructure of audiovisual services—Coding of moving video, Aug. 2020").

Figure 8B:
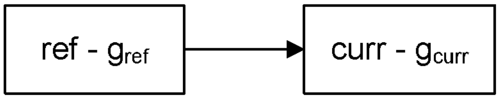

The limitation of the current existing approaches to code a cloud gaming video given the decoder-side partially rendered picture are presented. First, in the case of a systematic differential coding, as done in the example implementation of FIG. 7, the input pictures to the encoder consist in the difference (curr−g_curr) as illustrated in FIG. 8B. Consequently, when intra prediction is used for a given block, the signal (curr−g_curr) is coded. When inter prediction is used, the signal (curr−g_curr)−(ref−g_ref) is always coded. This last point is not optimal in compression efficiency. Indeed, it is known in scalable coding that pure inter prediction of the enhancement block curr with the temporal enhancement block ref is sometimes more efficient than performing inter prediction between differential signals (curr−g_curr) and (ref−g_ref). Therefore, the layered approach of FIG. 8B is not rate distortion optimal.

Figure 8C:
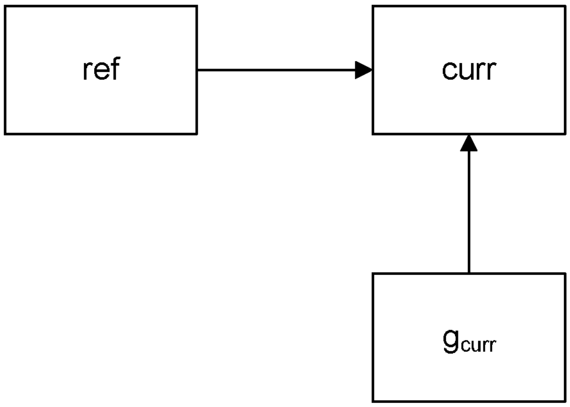

On the other hand, FIG. 8C illustrates prediction modes allowed in the case of external pictures. It illustrates the typical prediction modes that may be used in the coding of a current picture curr, when the base picture g_curr is employed as a reference picture, through the external reference picture mechanism proposed above in FIGS. 5A and 5B for instance. In this coding architecture, a given block of picture curr can be predicted from a temporal reference picture of current video layer ref or from the external picture that corresponds to the base picture g_curr. Therefore, the residual signal to code is of the form (curr−g_curr) or (ref−g_ref). This is not rate distortion optimal, because in this case, no temporal predictive coding of the differential signal (curr−g_curr) can be performed.

Embodiments described hereafter have been designed with the foregoing in mind.

At least one embodiment relates to a video coding system for an image of a video representative of a virtual environment, the video coding system providing temporal prediction for a current image using a reference picture buffer storing at least an image based on a second image, the second image being obtained from graphics renderer and the quality of the second image being lower than the quality of the current image. An encoding method, decoding method, encoding apparatus, decoding apparatus are described, as well as corresponding computer program and non-transitory computer readable medium.

In at least one embodiment, the encoding is based on a layered coding approach where systematic differential coding applies. In at least one embodiment, the encoding is based on external reference pictures. In at least one variant of this embodiment, the server device is a game server and the client device is selected in a group comprising a smartphone, a tablet, a computer, a game console, a set top box.

Figure 9:
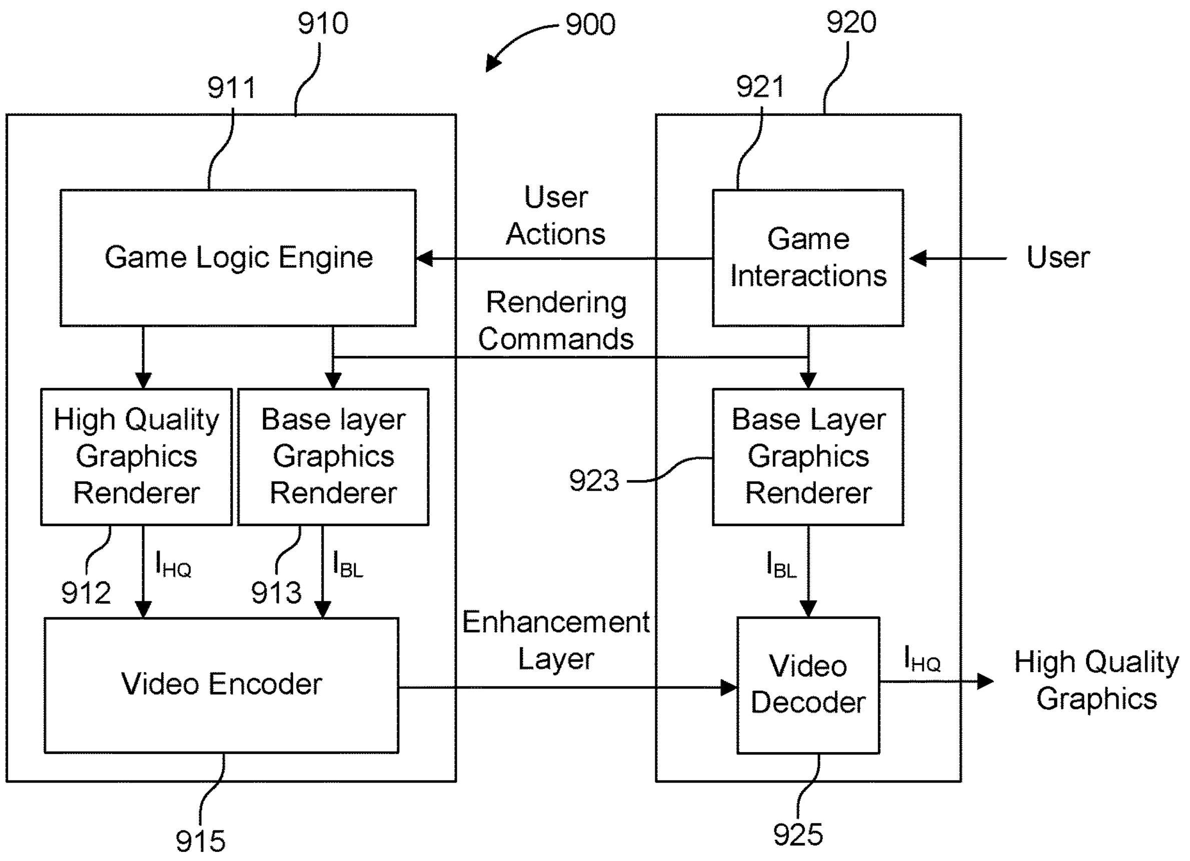
FIG. 9 illustrates an example of a cloud gaming system according to an embodiment.

FIG. 9 illustrates an example of a cloud gaming system according to an embodiment. The cloud gaming system 900 comprises a game server 910 and a game client device 920. On the game server side, based on the virtual environment, the game logic engine 911 instructs a high quality graphics renderer 912 to generate a high quality image $I_{HQ}$ and a base layer graphics renderer 913 to generate a base layer image $I_{BL}$. The video encoder 915 generates a scalable video using reference pictures based on the high quality image $I_{HQ}$ and the base layer image. On the game client device 920, a base layer graphics renderer 923 obtains the rendering commands either from the game logic engine 921 of the server 910 or from a game interactions module 921 of the client device. It generates a base layer image $I_{BL}$ which should be identical to the base layer image generated on the server side. A video decoder 925 receives the scalable video and reconstructs a high quality image $I_{HQ}$ from the based layer image $I_{BL}$. The user provides some interactions through appropriate input interfaces, conveyed tough the game interactions module 921 back to the game server 910. The game logic can then update the parameters of the 3D virtual environment (for example modify the position and/or point of view of the user according to his/her movements) and request the graphics renderers to generate update images. The server device 910 and client device 920 are typically implemented by a device 1000 as illustrated in FIG. 3.

As introduced above, the game resources are derived into two versions: high quality image and base layer image. The base layer images are generated using less computation and memory requirements and may be particularly adapted to the rendering on a client device such as a tablet, smartphone, set top box, and other consumer electronics devices. Thus, the base layer images may be rendered using textures with reduced resolution, reduced level of detail, some costly rendering effects may be skipped or simplified (lighting, shadow, smoke, particles). Other well-known techniques may be used to reduce the complexity of the graphics rendering process when compared to a high quality rendering.

Although FIG. 9 illustrates the use of two separate graphics renderers 912 and 913 on the server device 910, it is not mandatory to use separate renderers. Indeed, the same principles apply when a single renderer is used, for example as shown in FIG. 7 with the graphics renderer 713 of server device 710, with the constraint that this single renderer must be able to generate both a high quality image and a base layer image.

Figure 10:
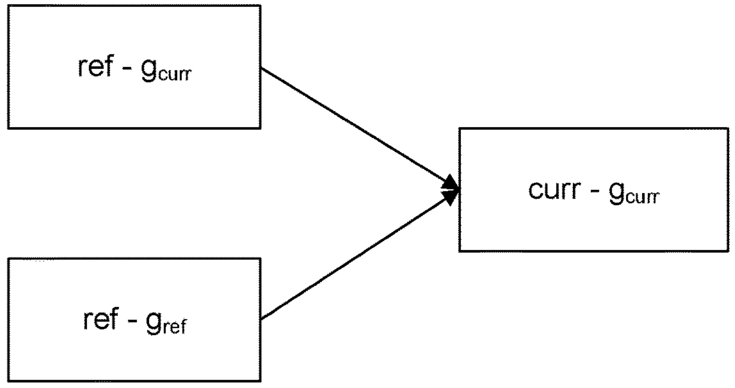
FIG. 10 illustrates an enriched set of reference pictures in the layered coding approach according to a first embodiment where systematic differential coding is used.

FIG. 10 illustrates an enriched set of reference pictures in the layered coding approach according to a first embodiment where systematic differential coding is used. As shown in the figure, the reference picture (ref−$g_{curr}$) is added to the set of reference pictures used to predictively code or decode the current differential picture (curr−$g_{curr}$). This way, the prediction modes allow to code a given block in current differential picture are the following one:

(curr−g_curr) through intra coding the block ($curr-g_{curr}$)−($ref-g_{ref}$) through the temporal prediction on the block with the reference picture, ($curr-g_{curr}$)−($ref-g_{curr}$)=(curr−ref): the temporal prediction of the current block of the original picture curr being coded in non-differential mode. This prediction mode is allowed thanks to the proposed enriched set of reference pictures and leads to increased compression efficiency.

Figure 11:
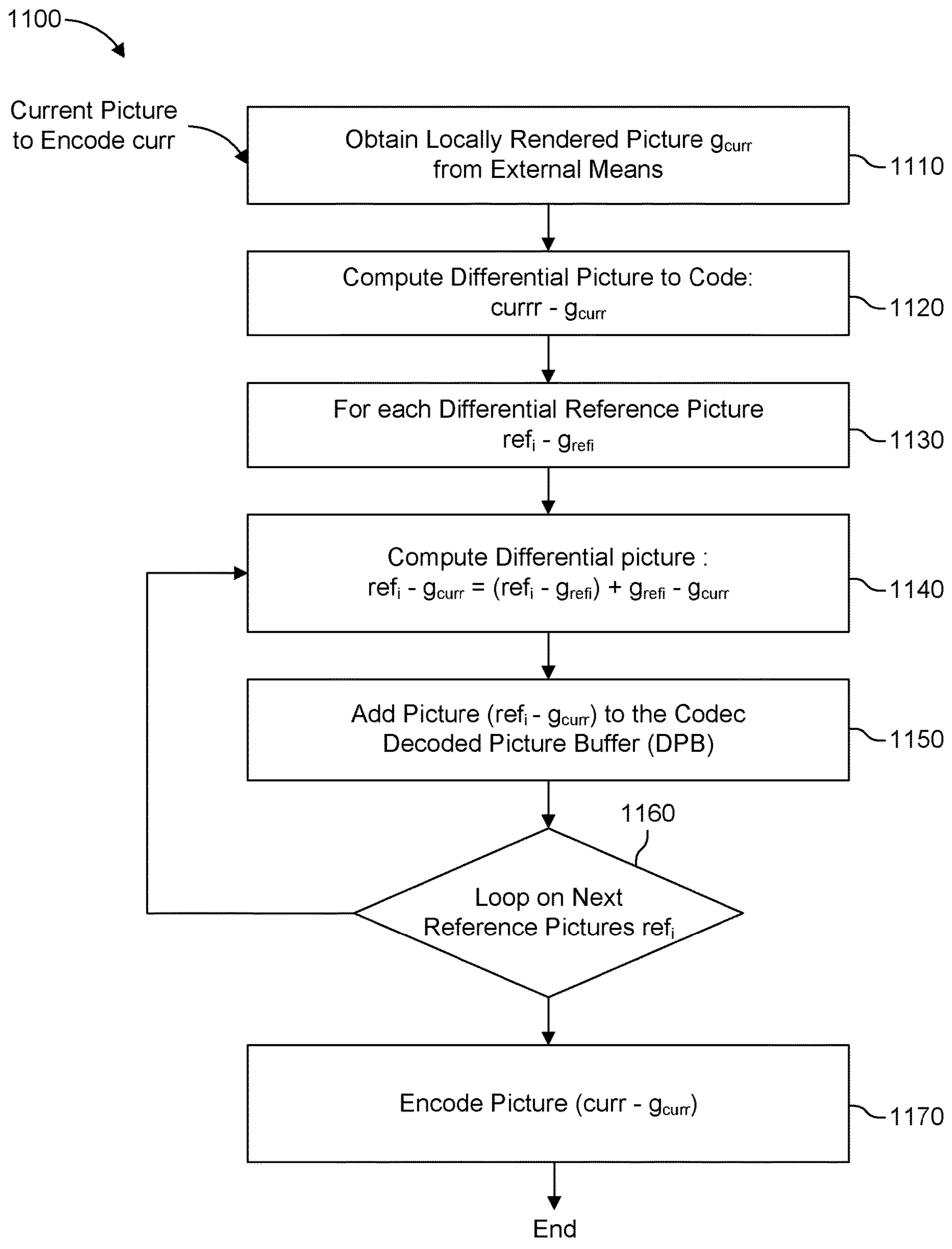
FIG. 11 illustrates the coding process for a picture of the video, corresponding to the first embodiment where an enriched set of reference pictures in a layered coding approach where systematic differential coding is used.

FIG. 11 illustrates the coding process for a picture of the video, corresponding to the first embodiment where an enriched set of reference pictures in a layered coding approach where systematic differential coding is used. Such process 1100 is typically implemented by a server device 710 or 910. It is proposed to benefit from at least one additional reference picture in order to allow for pure motion compensated temporal prediction that is equivalent to the case where the base layer is not used at all, in the layered differential coding system of FIG. 7. The input to the process 1100 is the current picture to encode curr. The first step 1110 comprises obtaining the base layer rendered picture noted $g_{curr}$ from means that are external to the video codec, for example the graphics renderer 913. Then, in step 1120, the differential picture to compress with the considered video encoder is computed as ($curr-g_{curr}$). Next step 1130 comprises a loop (steps 1140 to 1160) over reference pictures contained in the Decoded Picture Buffer (DPB), used to code the current differential picture ($curr-g_{curr}$). These reference pictures are already differential pictures of the form ($ref_i-g_{refi}$), where:

i stands for the reference picture index $ref_i$ corresponds to the original picture that has already been processed by the algorithm of FIG. 11 and temporally coincides with the reference picture with index i $g_{refi}$ is the base layer rendered picture provided by the external game rendering means, for example the graphics renderer 913, and that was used to code the differential picture ($ref_i-g_{refi}$). This picture may be stored in a buffer for further use.

For each differential reference picture ($ref_i-g_{refi}$) contained in the Decoded Picture Buffer and used to predict current picture, the following is applied:

In step 1140, a new differential signal ($ref_i-g_{curr}$) is determined by the difference between the reference picture according to the index i and the base layer rendered picture $g_{curr}$;

In step 1150, this new differential signal ($ref_i-g_{curr}$) is added to the Decoded Picture Buffer as an additional reference picture used to predict the current differential picture ($curr-g_{curr}$).

Once this loop is done, the current differential picture ($curr-g_{curr}$) is conventionally compressed by the considered coder in step 1170, and the process is over.

As previously explained the proposed enriched set of reference pictures allows the prediction of the signal ($curr-g_{curr}$) in a way that is equivalent to predicting the current original picture signal curr from the reference picture refi. The additional choice available at the encoder side leads to increased coding efficiency.

For the step 1140, in at least one embodiment, according to the reference picture index i, a signal ($g_{refi}-g_{curr}$) is determined by the difference between the corresponding base layer reference image $g_{refi}$ and the base layer rendered picture $g_{curr}$, this signal ($g_{refi}-g_{curr}$) is being added to the differential reference picture ($ref_i-g_{refi}$) to determine a new differential signal ($ref_i-g_{curr}$). For that purpose, the base layer reference image $g_{refi}$ formerly rendered by the base layer graphics renderer should be kept in a buffer in memory to be further reused. Since it relates to the base layer image, the memory requirements for storing these reference images are lower than there would be for storing the high-quality reference images.

Figure 12:
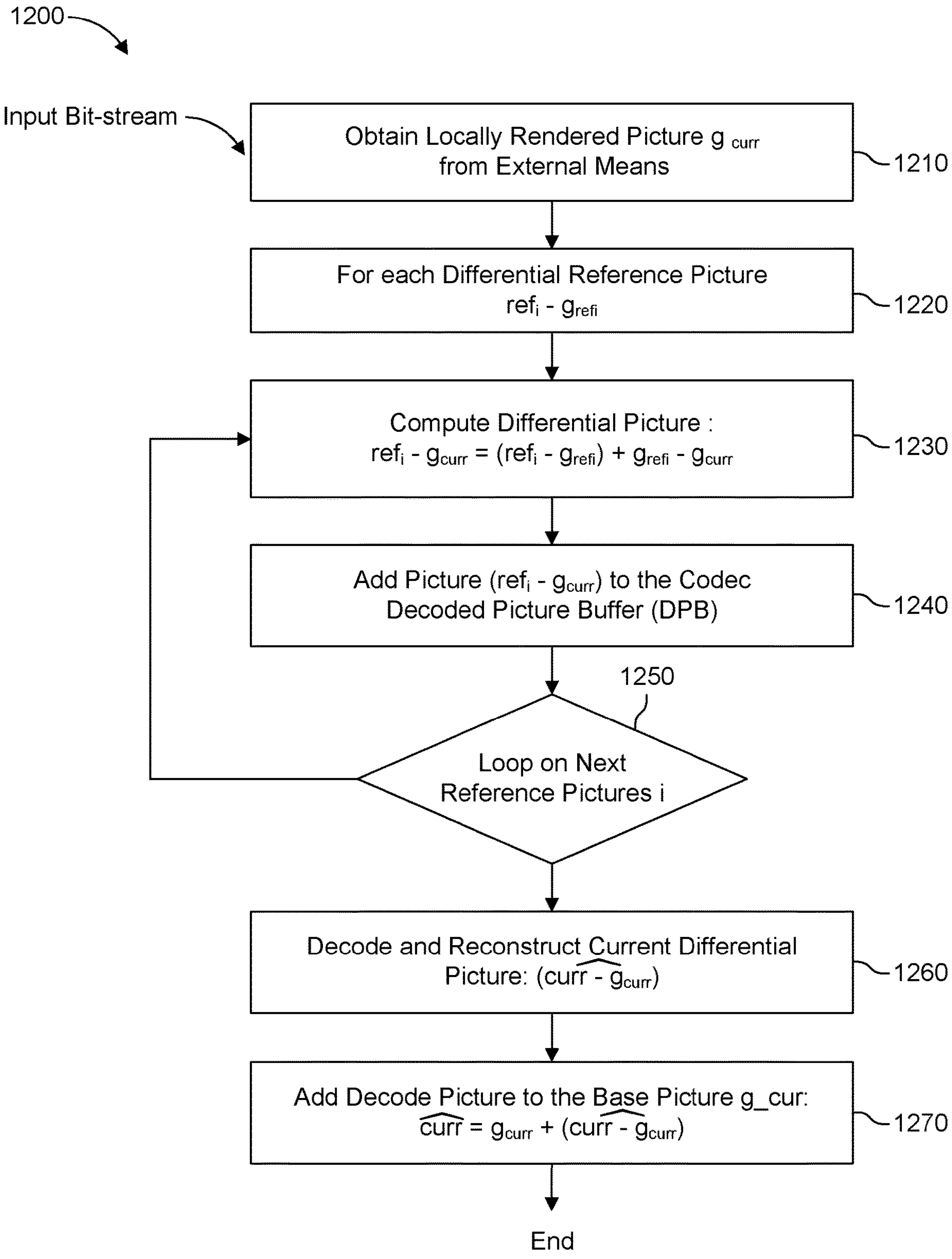
FIG. 12 illustrates the decoding process for a picture of the video, corresponding to the first embodiment where an enriched set of reference pictures in the layered coding approach where systematic differential coding is used.

FIG. 12 illustrates the decoding process for a picture of the video, corresponding to the first embodiment where an enriched set of reference pictures in the layered coding approach where systematic differential coding is used. In other words, it corresponds to the reciprocal process of the coding process of FIG. 11. Such process 1200 is typically implemented by a client device 720.

The input to the process 1200 is the coded video bitstream, for example encoded using the process illustrated in FIG. 11. The first step 1210 comprises obtaining the base layer rendered picture noted $g_{curr}$ from means that are external to the video codec, for example from the base layer graphics renderer 723. Then, step 1220 comprises a loop (steps 1230 to 1250) over reference pictures contained in the Decoded Picture Buffer (DPB), used to code the current differential picture ($curr-g_{curr}$). These reference pictures are also differential pictures of the form ($ref_i-g_{refi}$), similarly to the encoder side. For each differential reference picture ($ref_i-g_{refi}$) used to predict current picture, the following is applied:

In step 1230, a new differential signal ($ref_i-g_{curr}$) is determined by the difference between the reference picture according to the index i and the base layer rendered picture $g_{curr}$.

In step 1240, this differential signal ($ref_i-g_{curr}$) is added to the Decoded Picture Buffer as an additional reference picture used to predict the current differential picture ($curr-g_{curr}$).

Once this loop is done, the current differential picture ($curr-g_{curr}$) is conventionally decoded by the considered video decoder. This leads, in step 1260, to the reconstructed picture ($\widehat{curr-g_{curr}}$). Once this differential signal is reconstructed, the final picture to be displayed by the cloud gaming client is computed in step 1270 as: $\widehat{curr}=(\widehat{curr-g_{curr}})+g_{curr}$. Once this is done the decoding process is over.

In at least one embodiment of the encoding and decoding processes of FIGS. 11 and 12, only one additional reference picture of the type ($ref_i-g_{curr}$) is computed and used by the codec. This single additional reference picture may be computed with the reference picture index i that corresponds to the closest reference picture to current picture, in terms of temporal distance. In another embodiment based on the same principle, the single added reference picture may be based on the reference picture that has been coded/decoded with the smallest quantization parameter among available reference pictures. In another embodiment based on the same principle, the single added reference picture may be based on the reference picture that has been coded/decoded with the smallest temporal layer among available reference pictures.

Figure 13:
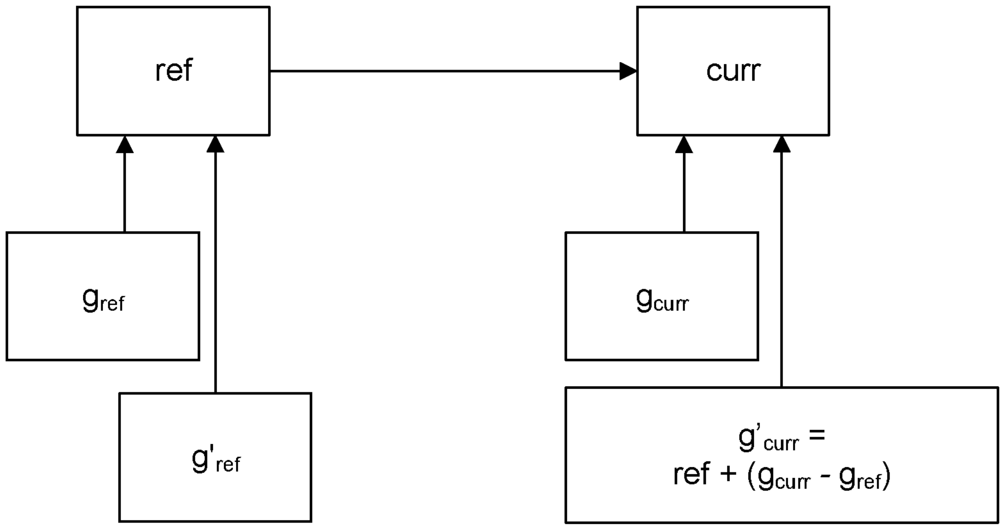
FIG. 13 illustrates an enriched set of reference pictures in a coding approach according to a second embodiment where an external reference picture is used.

FIG. 13 illustrates an enriched set of reference pictures in a coding approach according to a second embodiment where an external reference picture is used. The proposed embodiment modifies the external reference picture based architecture previously presented with reference to FIG. 8C.

As can be seen a reference picture noted $g'_{curr}$ is used to code current picture curr, in addition to the usual temporal reference picture ref and the already-in-place external reference picture $g_{curr}$. The additional reference picture $$g'_{curr}$$

is defined as follows:

$$g'_{curr} = ref + (g_{curr} - g_{ref})$$

where $g_{ref}$ is the base layer picture already introduced above. In the current coding scenario, it has been used as an external reference picture to code or decode the already-processed picture ref.

By adding the reference picture $$g'_{curr}$$

as a candidate reference picture to encode or decode blocks of the current picture curr, the encoder has the possibility to compute and code one of the three following types of residual signals:

- (curr−g_curr) through inter prediction from the exernal reference picture coding the block;
- (curr−ref) through the temporal prediction of the current block of the original picture curr, with reference blocks contained in the usual reference picture ref; and
- (curr−$g'_{curr}$) through the temporal prediction on the block with the newly introduced reference picture gourr. This residual signal is this equal to the following:

$$\begin{aligned} curr - g'_{curr} &= curr - (ref + (g_{curr} - g_{ref})) \\ &= (curr - g_{curr}) - (ref - g_{ref}) \end{aligned}.$$

Therefore, this added candidate prediction mode is equivalent to a scalable coding of the signal curr in differential mode over g_curr and by means of temporal prediction from the current reference picture ref represented in the differential domain over its own external picture $g_{ref}$.

As a result, the above third prediction mode is used to code the current picture curr, in addition to prediction modes already present in the conventional external reference picture based coding principles described in FIGS. 5A and 5B. The advantage of this added prediction mode is increased coding efficiency over conventional external reference picture based coding, especially in the context of cloud gaming with local partial graphics rendering of base layer images on the client device.

Figure 14:
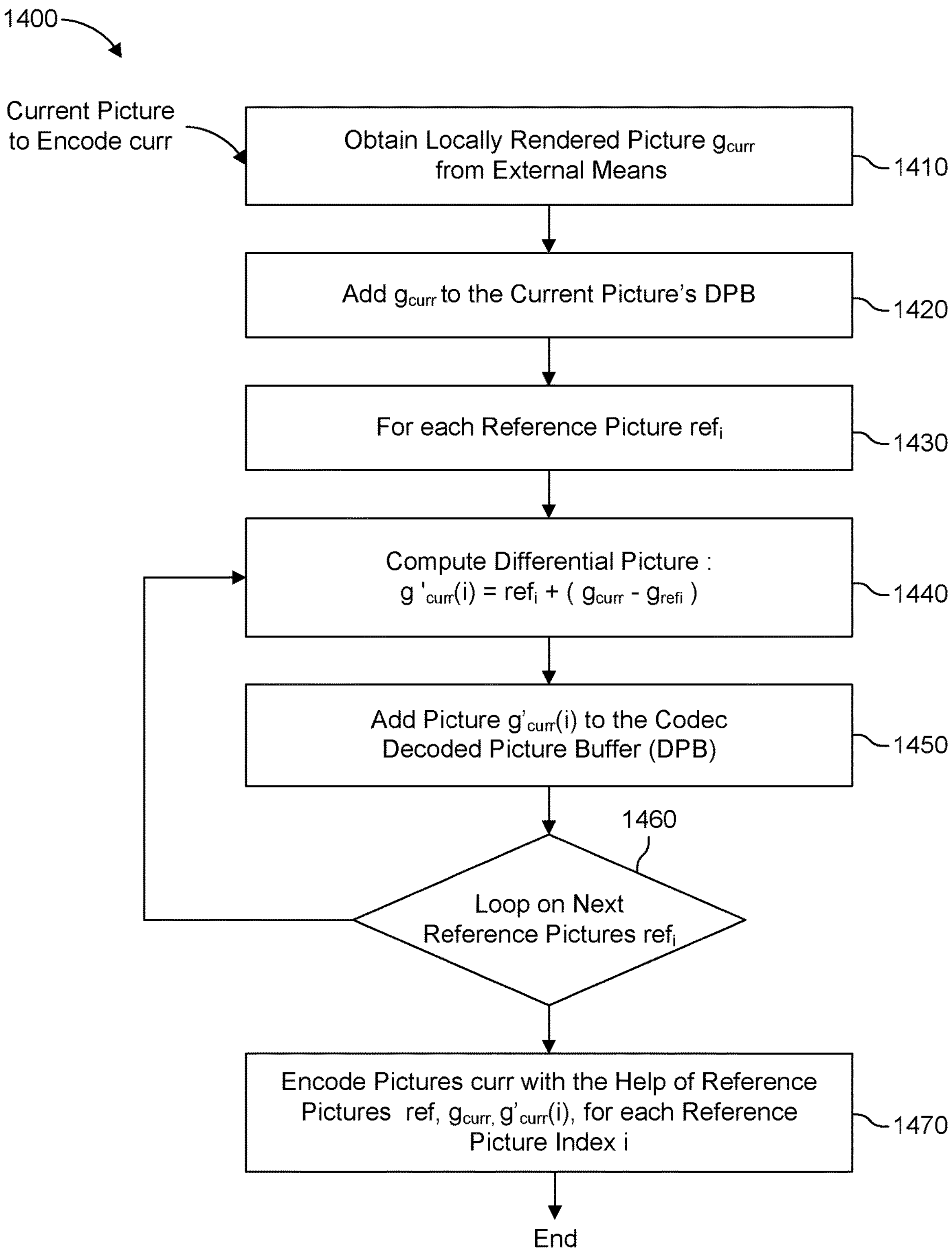
FIG. 14 illustrates the coding process for a picture of the video, corresponding to the second embodiment where an external reference picture is used.

FIG. 14 illustrates the coding process for a picture of the video, corresponding to the second embodiment where an external reference picture is used. Such process is typically implemented by a server device 910. The input to the process 1400 is the current picture to encode curr. The first step 1410 comprises obtaining the partially rendered base layer picture noted $g_{curr}$ from means external from the video codec, for example from the base layer graphics renderer 913. In step 1420, this picture is inserted into the Decoded Picture Buffer (DPB) as a reference picture to code the current picture. Next, from step 1430 to 1460, a loop over reference pictures contained in the DPB, used to code the current picture curr is performed. These reference pictures are noted $ref_i$, where:

- i stands for the reference picture index;
- $ref_i$ correspond to the reconstructed picture that has already been produced by the algorithm for a previous picture.

For each reference picture $ref_i$, the partially rendered base layer picture provided by the base layer graphics renderer 913 that temporally coincides with $ref_i$ is noted $g_{ref_i}$. The additional reference picture $$g'_{curr}(i)$$

is computed in step 1440 as follows:

$$g'_{curr}(i) = ref_i + (g_{curr} - g_{ref_i})$$

Next, in step 1450 the picture $$g'_{curr}(i)$$

is added to the DPB as an additional reference picture used to predict the current picture curr.

Once this loop is done, the current differential picture curr is regularly compressed by the considered coder in step 1470, and the coding process is over. This encoding makes use of the reference pictures $ref_i$, $$g_{curr},\ g'_{curr}(i),$$

for each reference picture index i.

Figure 15:
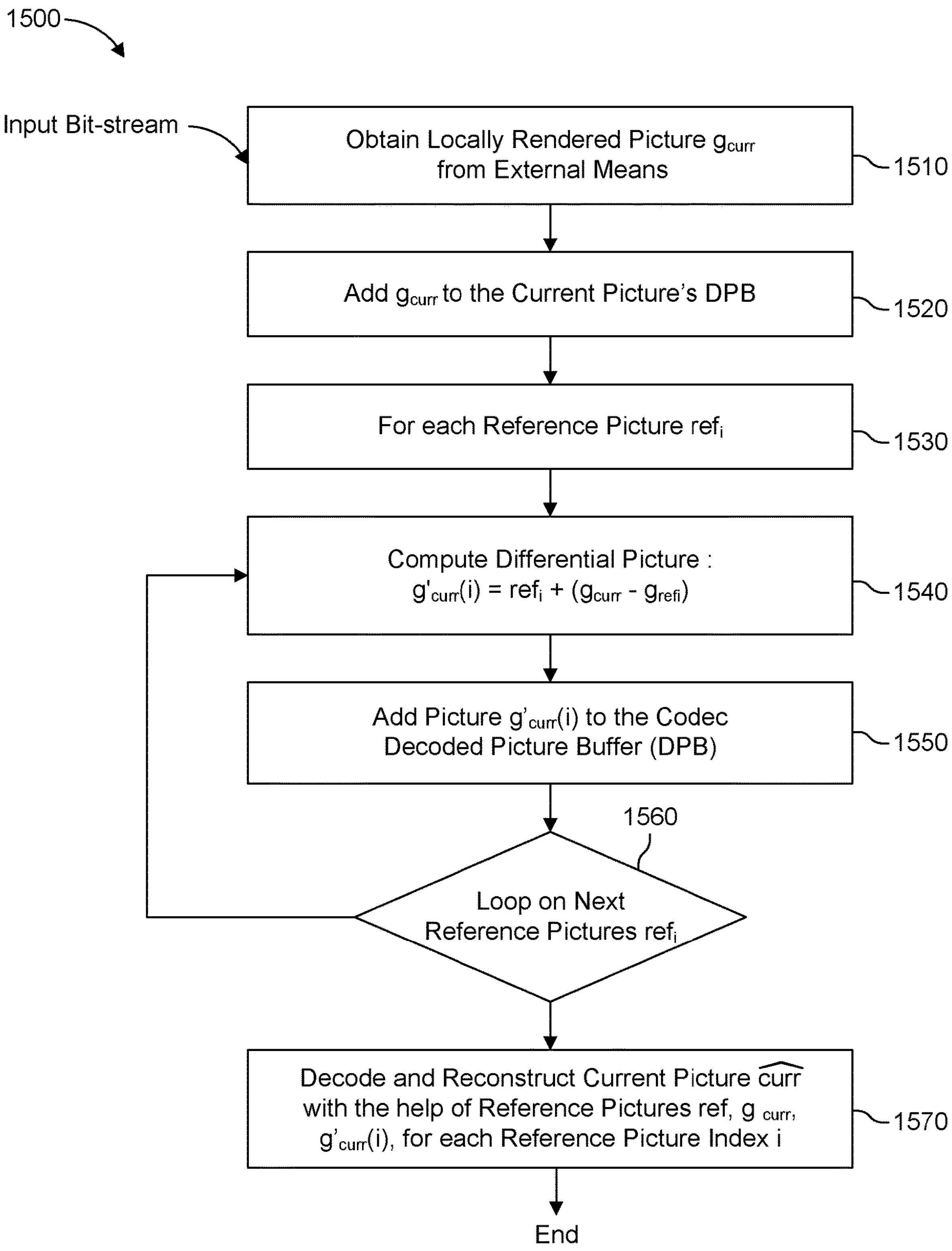
FIG. 15 illustrates the decoding process for a picture of the video, corresponding to the second embodiment where an external reference picture is used.

FIG. 15 illustrates the decoding process for a picture of the video, corresponding to the second embodiment where an external reference picture is used. Such process 1500 is typically implemented by a client device 920. The input to the process 1500 is the coded video bit-stream contained the current picture to decode curr. The first step 1510 comprises obtaining the partially rendered base layer picture noted $g_{curr}$ provided by the base layer graphics renderer 913. In step 1520, this picture is inserted into the DPB as a reference picture to code the current picture.

Next, from step 1530 to 1560, a loop over reference pictures contained in the DPB, used to code the current picture curr is performed. These reference pictures are noted $ref_i$, where:

- i stands for the reference picture index
- $ref_i$ correspond to the original picture that has already been processed by the same algorithm for a previous picture.

For each reference picture $ref_i$, the partially rendered picture provided by the external game rendering means that temporally coincides with $ref_i$ is noted $g_{ref_i}$. The additional reference picture $$g'_{curr}(i)$$

is computed, in step 1540, as follows:

$$g'_{curr}(i) = ref_i + (g_{curr} - g_{ref_i})$$

Next, in step 1550, the picture $g'_{curr}(i)$ is added to the DPB as an additional reference picture used to predict the current picture curr.

Once this loop is done, the current differential picture curr is regularly decoded in step 1570 by the considered decoder, and the decoding process is over. This decoding makes use of the reference pictures $$ref_i, g_{curr}, g'_{curr}(i),$$

for each reference picture index i.

According to an embodiment of the encoding and decoding processes of FIGS. 14 and 15, only one additional reference picture of the type $$g'_{curr}(i)$$

is computed and used by the codec. This single additional reference picture may be computed with the reference picture index i that corresponds to the closest reference picture to current picture, in terms of temporal distance. In another embodiment, the single added reference picture may be based on the reference picture that has been coded/decoded with the smallest quantization parameter among available reference pictures. In another embodiment, the single added reference picture may be based on the reference picture that has been coded/decoded with the smallest temporal layer among available reference pictures.

In the first and second embodiments described above, the inter layer prediction mainly takes the form of inter layer texture prediction, either through the differential coding of the first embodiment, or through the temporal prediction from the introduced external reference picture in the second embodiment.

It is known in scalable video compression that further coding efficiency improvement by also using inter-layer prediction of coding parameters beyond the texture information. Such further inter-layer prediction data typically comprises motion information.

In the following, the syntax enabling the inter-layer prediction of coding parameters other than the texture information, in the context of the external reference picture framework of FIGS. 5A and 5B, is introduced. These additional coding parameters are called external coding information (ECI). At least one embodiment is related to the case where ECI is external reference picture (ERP), thus considering an embodiment related to a single layer video stream where ERP is an additional reference picture provided by a base layer graphics renderer.

The principle of ERP may be extended to other types of coding parameters that may be useful for coding one Coding Unit (CU) of the video. For that purpose, an external coding parameter (ECP) is defined as a parameter or a set of parameters provided as external means and that may be used for coding one CU. In case the parameter is a reference picture, ECP is an ERP. Other types of ECP are, for example:

Motion-info: co-located motion information vectors and reference indexes (For example the sh_ecp_motion_info_flag of an example of video coding system), AIF flag: index of the motion compensation filter to use for coding current CU (For example the sh_ecp_aif_flag of an example of video coding system), Gpm_partition: Coding mode such CU or PU partition. For example, it can be the Geo or Triangle index (For example the sh_ecp_gpm_partition_flag of an example of video coding system) indicating the partition of the CU. Indeed, when the external process is computer generated image, the depth may be available and can be used to derive the coding partition.

Figures 16, 17:
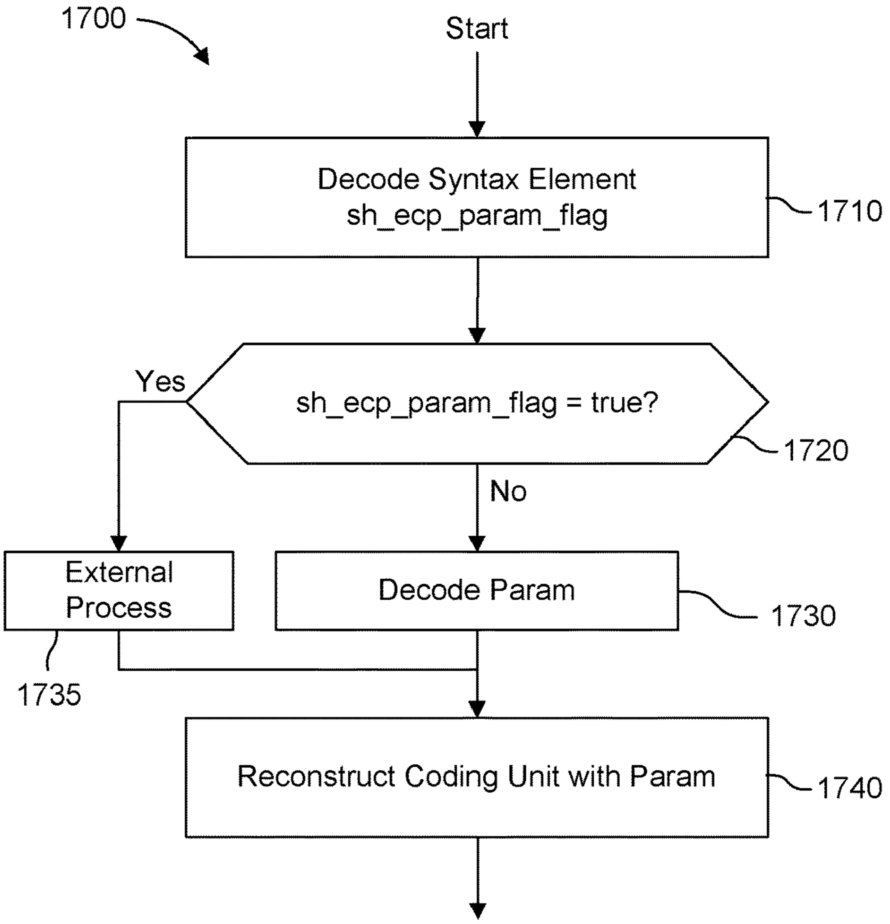
FIG. 16 illustrates an example of syntax according to one embodiment where information representative of external coding parameters are inserted into the slice header.
FIG. 17 illustrates a subset of the decoding process related to the external coding parameter.

FIG. 16 illustrates an example of syntax according to one embodiment where information representative of external coding parameters is inserted into the slice header. Other elements of the slice header syntax are the well-known conventional elements and are not represented in the figure. In another embodiment not illustrated, these information are inserted into the picture header.

FIG. 17 illustrates a subset of the decoding process related to the external coding parameter. The external coding parameter may replace one value derived from the regular decoding process and the corresponding syntax element is not coded in the bitstream. The process 1700 first decodes, in step 1710, the syntax element indicating the use of external coding parameters, for example the sh_ecp_param_flag coded in the slice header according to the syntax of FIG. 16. The syntax element sh_ecp_param_flag is tested in step 1720. If its value is true, then this indicates that param, which corresponds to one of the motion information, motion compensation interpolation filter, geometric partition mode, or some other CU-level coding parameter, is provided by external means in step 1735 and this syntax element param is not coded in the bitstream. At the decoder side, it is derived from external means. If sh_ecp_param_flag is false, the syntax element param is decoded normally in step 1730. The coding unit is then reconstructed conventionally in step 1740, with the param either provided in the coded video bitstream or obtained from the external process.

FIG. 18 illustrates an example of syntax according to an embodiment where the external coding parameter is Gpm_partition. In this case, the corresponding syntax element merge_gpm_partition_idx is not coded in the bitstream.

In a variant embodiment, the ECP parameter may be an additional coding parameter. For example, it can be an additional reference picture or an additional motion vector candidate. In case of ERP type, it means that the reference picture buffer will contain an additional reference picture provided by external means.

Figure 20:
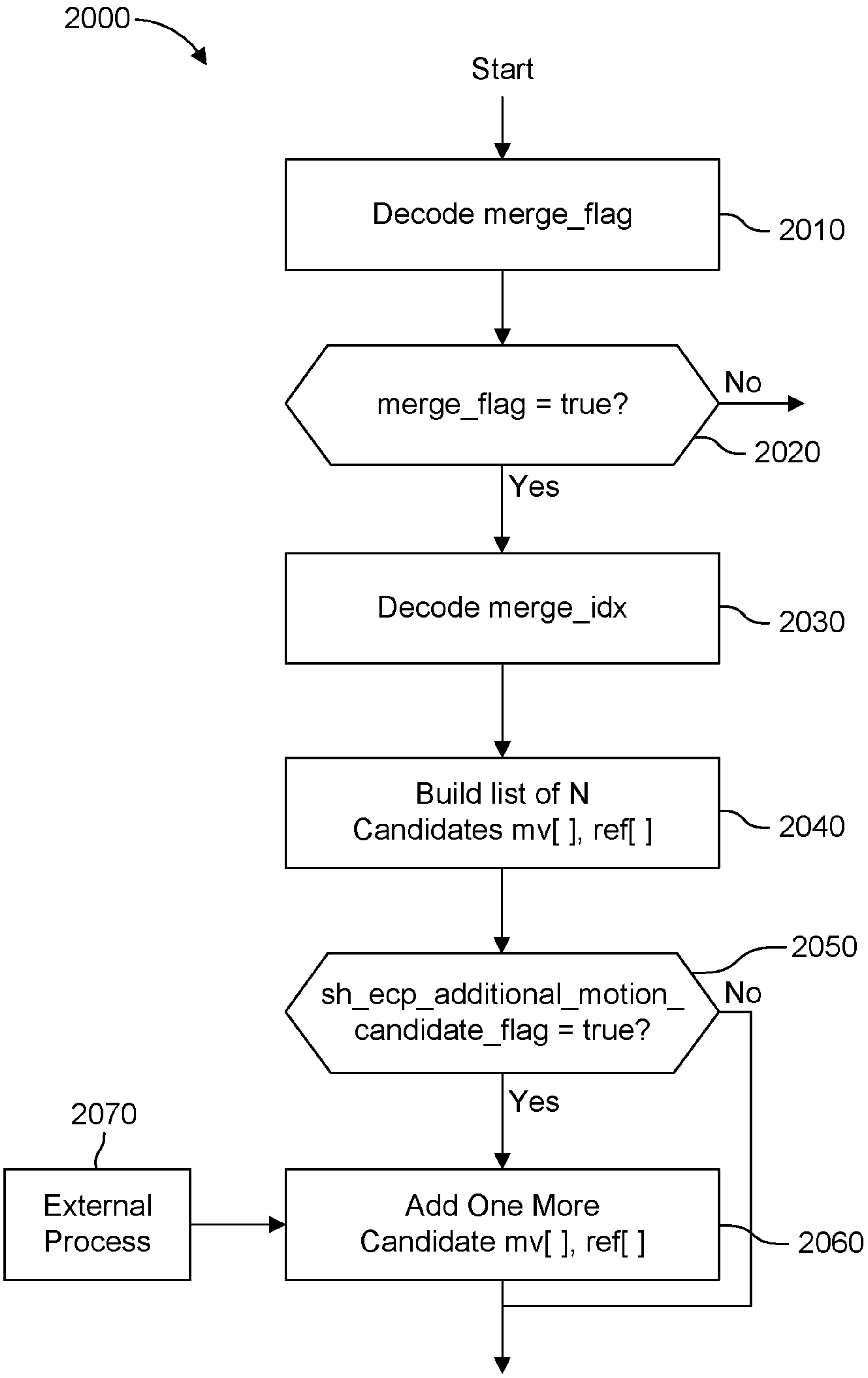
FIG. 20 illustrates a subset of the decoding process where the external coding parameter is an additional motion vector candidate.

FIG. 19 illustrates an example of syntax according to an embodiment where the external coding parameter is an additional motion vector candidate. FIG. 20 illustrates a subset of the decoding process where the external coding parameter is an additional motion vector candidate. Such embodiment relates to the sh_ecp_additional_motion_candidate_flag. The list of the motion vector candidates built in step 2040 and further used for different modes (such as AMVP or merge mode) is supplemented with an additional motion vector candidate in step 2060 provided by external means in step 2070.

When the external coding parameter is ERP and the ERP is generated according to the embodiment of FIGS. 9 to 12, the base layer rendered image is copied into the reference buffer of the video codec as ERP. The base layer rendered image may be a co-located reference picture, in other words it has the same POC as the current POC.

When the external coding parameter is ERP, the coding process may be modified. For example, at least one post-filter (such as deblocking filter or SAO or ALF for example) may be disabled. In a variant at least one other post-filter is applied (such as anti-aliasing post-filter for example). In addition, a flag coded in the bitstream may indicate whether the decoding process is modified with the ERP and more particularly the post-filtering.

In at least one embodiment, the ERP is removed from the DPB after the current picture has been reconstructed. In a variant embodiment, the ERP may be kept in the DPB for reconstructing subsequent pictures.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, moving the information, copying the information, calculating the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory or optical media storage). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It is to be appreciated that the terms "image" or "picture" are used indifferently and represent identical set of data.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for decoding a current picture of an encoded video comprising:

obtaining information representative of a three-dimensional (3D) environment for the current picture;

generating a second picture corresponding to a representation of the current picture, the second picture being generated by a 3D renderer based on rendering commands derived from the information representative of the 3D environment;

maintaining, in a decoded picture buffer, an enriched set of reference pictures, the enriched set comprising:

at least one previously encoded differential picture of the form (refi-grefi), where refi is a prior input picture and grefi is a prior generated second picture corresponding to refi; and at least one additionally computed differential picture of the form (refi-gcurr), where refi is a prior input picture and gcurr is the generated second picture; and decoding a current differential picture from the encoded video, the decoding comprising performing temporal prediction of the current differential picture using at least one reference differential picture stored in the decoded picture buffer; and reconstructing the current picture by adding the decoded current differential picture to the generated second picture.

2. The method of claim 1, wherein the encoding uses inter layer prediction.

3. The method of claim 1, wherein the resolution of the second picture is lower than the resolution of the current picture.

4. The method of claim 1, wherein the quality of the second picture is lower than the quality of the current picture.

5. A method for encoding a current picture of a video comprising:

obtaining information representative of a three-dimensional (3D) environment for the current picture;

generating a second picture corresponding to a representation of the current picture, the second picture being generated by a 3D renderer based on rendering commands derived from the information representative of the 3D environment;

computing a current differential picture based on the current picture and the generated second picture;

maintaining, in a decoded picture buffer, an enriched set of reference pictures, the enriched set comprising:

at least one previously encoded differential picture of the form (refi-grefi), where refi is a prior input picture and grefi is a prior generated second picture corresponding to refi; and at least one additionally computed differential picture of the form (refi-gcurr), where refi is a prior input picture and gcurr is the generated second picture; and encoding the current differential picture based on the decoded picture buffer, the encoding comprising performing temporal prediction of the current differential picture using at least one reference differential picture stored in the decoded picture buffer.

6. The method of claim 5, wherein the encoding uses inter layer prediction.

7. The method of claim 5, wherein the resolution of the second picture is lower than the resolution of the current picture.

8. The method of claim 5, wherein the quality of the second picture is lower than the quality of the current picture.

9. An apparatus for decoding a current picture of an encoded video comprising:

a three-dimensional (3D) renderer configured to generate a second picture corresponding to a representation of the current picture based on rendering commands derived from information representative of a 3D environment for the current picture; and a decoder being configured to:

obtain information representative of the 3D environment for the current picture;

maintain, in a decoded picture buffer, an enriched set of reference pictures, the enriched set comprising:

at least one previously encoded differential picture of the form (refi-grefi), where refi is a prior input picture and grefi is a prior generated second picture corresponding to refi; and at least one additionally computed differential picture of the form (refi-gcurr), where refi is a prior input picture and gcurr is the generated second picture; and decode a current differential picture from the encoded video, the decoding comprising performing temporal prediction of the current differential picture using at least one reference differential picture stored in the decoded picture buffer; and reconstruct the current picture by adding the decoded current differential picture to the generated second picture.

10. The apparatus of claim 9, wherein the encoding uses inter layer prediction.

11. The apparatus of claim 9, wherein the resolution of the second picture is lower than the resolution of the current picture.

12. The apparatus of claim 9, wherein the quality of the second picture is lower than the quality of the current picture.

13. An apparatus for encoding a current picture of a video comprising:

a three-dimensional (3D) renderer configured to generate a second picture corresponding to a representation of the current picture based on rendering commands derived from information representative of a 3D environment for the current picture; and an encoder being configured to:

obtain information representative of the 3D environment for the current picture;

compute a current differential picture based on the current picture and the generated second picture;

maintain, in a decoded picture buffer, an enriched set of reference pictures, the enriched set comprising:

at least one previously encoded differential picture of the form (refi-grefi), where refi is a prior input picture and grefi is a prior generated second picture corresponding to refi; and at least one additionally computed differential picture of the form (refi-gcurr), where refi is a prior input picture and gcurr is the generated second picture; and encode the current differential picture based on the decoded picture buffer, the encoding comprising performing temporal prediction of the current differential picture using at least one reference differential picture stored in the decoded picture buffer.

14. The apparatus of claim 13, wherein the encoding uses inter layer prediction.

15. The apparatus of claim 13, wherein the resolution of the second picture is lower than the resolution of the current picture.

16. The apparatus of claim 13, wherein the quality of the second picture is lower than the quality of the current picture.

* * * * *